US009446806B2

(12) United States Patent
Okada

(10) Patent No.: US 9,446,806 B2
(45) Date of Patent: Sep. 20, 2016

(54) RUBBER CRAWLER

(71) Applicant: BRIDGESTONE CORPORATION, Chuo-ku, Tokyo (JP)

(72) Inventor: Kaoru Okada, Yokohama (JP)

(73) Assignee: BRIDGESTONE CORPORATION, Tokyo (JP)

(*) Notice: Subject to any disclaimer, the term of this patent is extended or adjusted under 35 U.S.C. 154(b) by 0 days.

(21) Appl. No.: 14/386,371

(22) PCT Filed: Mar. 12, 2013

(86) PCT No.: PCT/JP2013/056839
§ 371 (c)(1),
(2) Date: Sep. 19, 2014

(87) PCT Pub. No.: WO2013/141087
PCT Pub. Date: Sep. 26, 2013

(65) Prior Publication Data
US 2015/0048672 A1    Feb. 19, 2015

(30) Foreign Application Priority Data

Mar. 22, 2012  (JP) .................. 2012-066177
Apr. 16, 2012  (JP) .................. 2012-093100

(51) Int. Cl.
B62D 55/24     (2006.01)
(52) U.S. Cl.
CPC ............. B62D 55/24 (2013.01); B62D 55/244 (2013.01)
(58) Field of Classification Search
CPC .. B62D 55/24; B62D 55/244; B62D 55/242; B62D 55/253; B62D 55/26

USPC .................. 305/165, 166, 167, 170
See application file for complete search history.

(56) References Cited

U.S. PATENT DOCUMENTS

| 6,843,539 B2* | 1/2005 | Tsuru ............. B62D 55/244 305/170 |
| 6,913,329 B1 | 7/2005 | Rodgers et al. |
| 8,016,368 B2* | 9/2011 | Sugihara ......... B62D 55/244 305/166 |

FOREIGN PATENT DOCUMENTS

| JP | 2002-145137 A | 5/2002 |
| JP | 2006-160069 A | 6/2006 |
| JP | 2009-029206 A | 2/2009 |
| JP | 2010-254759 A | 11/2010 |

(Continued)

OTHER PUBLICATIONS

Mechanical translation of JP2009-029206, Feb. 12, 2009.*

(Continued)

Primary Examiner — John Walters
(74) Attorney, Agent, or Firm — Sughrue Mion, PLLC

(57) ABSTRACT

A rubber crawler has: an endless rubber belt that is entrained about plural wheels; plural rubber projections that are disposed on the rubber belt and spaced apart from one another in a crawler circumferential direction, project toward an inner peripheral side of the rubber belt, and come into contact with the wheels to limit the movement of the wheels in a crawler width direction; and a low-hardness rubber portion that configures part of an inner peripheral surface of the rubber belt, is disposed between mutually adjacent rubber projections, and is formed by a rubber having a lower hardness than the rubber projections.

10 Claims, 19 Drawing Sheets

(56) References Cited

FOREIGN PATENT DOCUMENTS

| | | | | |
|---|---|---|---|---|
| JP | 2010254166 A | 11/2010 | | |
| JP | WO 2011034125 A1 * | 3/2011 | ........... | B62D 55/244 |
| JP | 2011-195085 A | 10/2011 | | |
| WO | 2011/034125 A1 | 3/2011 | | |

OTHER PUBLICATIONS

Communication dated Aug. 18, 2015 from the Japanese Patent Office issued in corresponding Japanese application No. 2012093100.

International Search Report for PCT/JP2013/056839 dated Apr. 9, 2013.

* cited by examiner

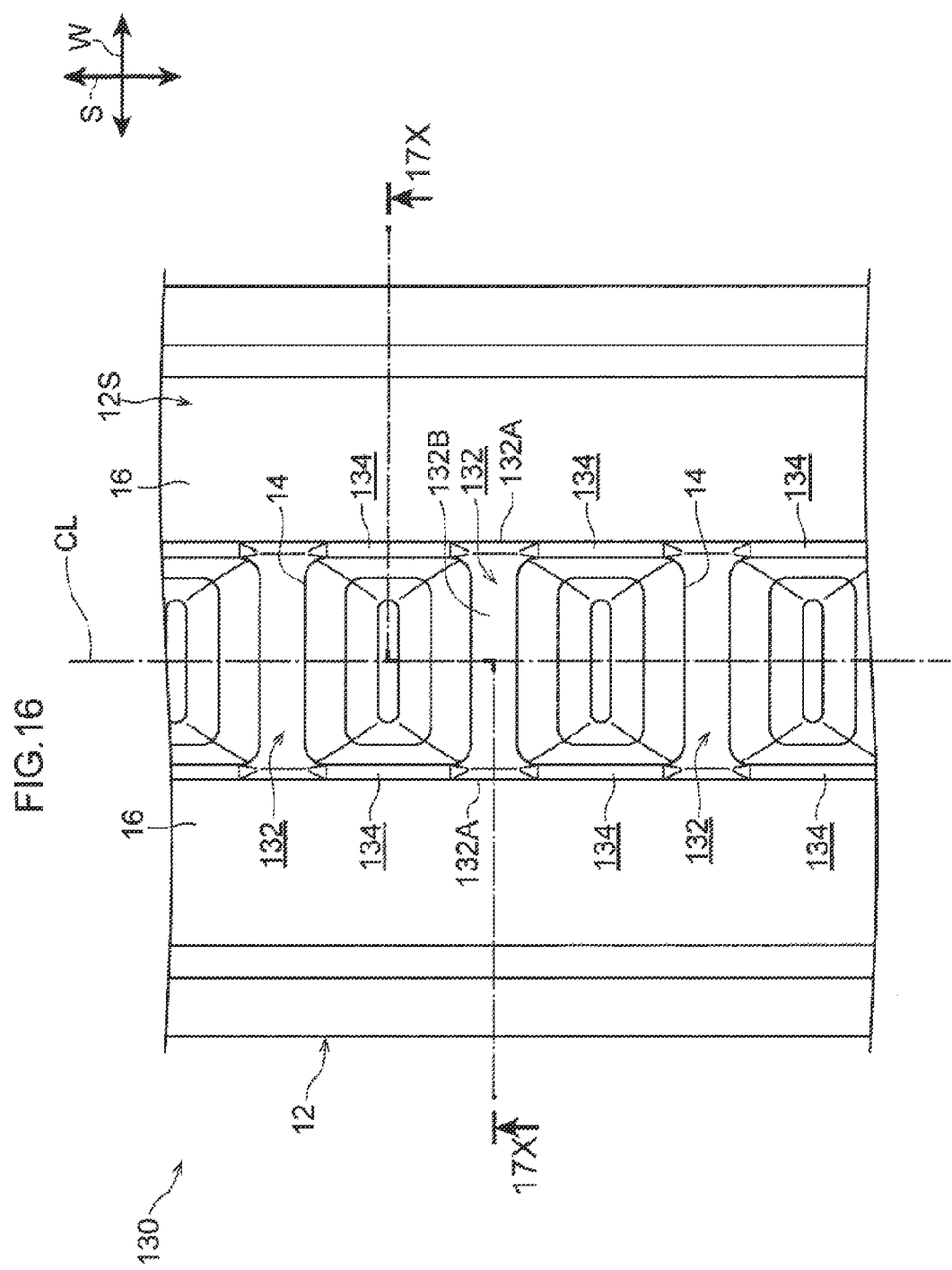

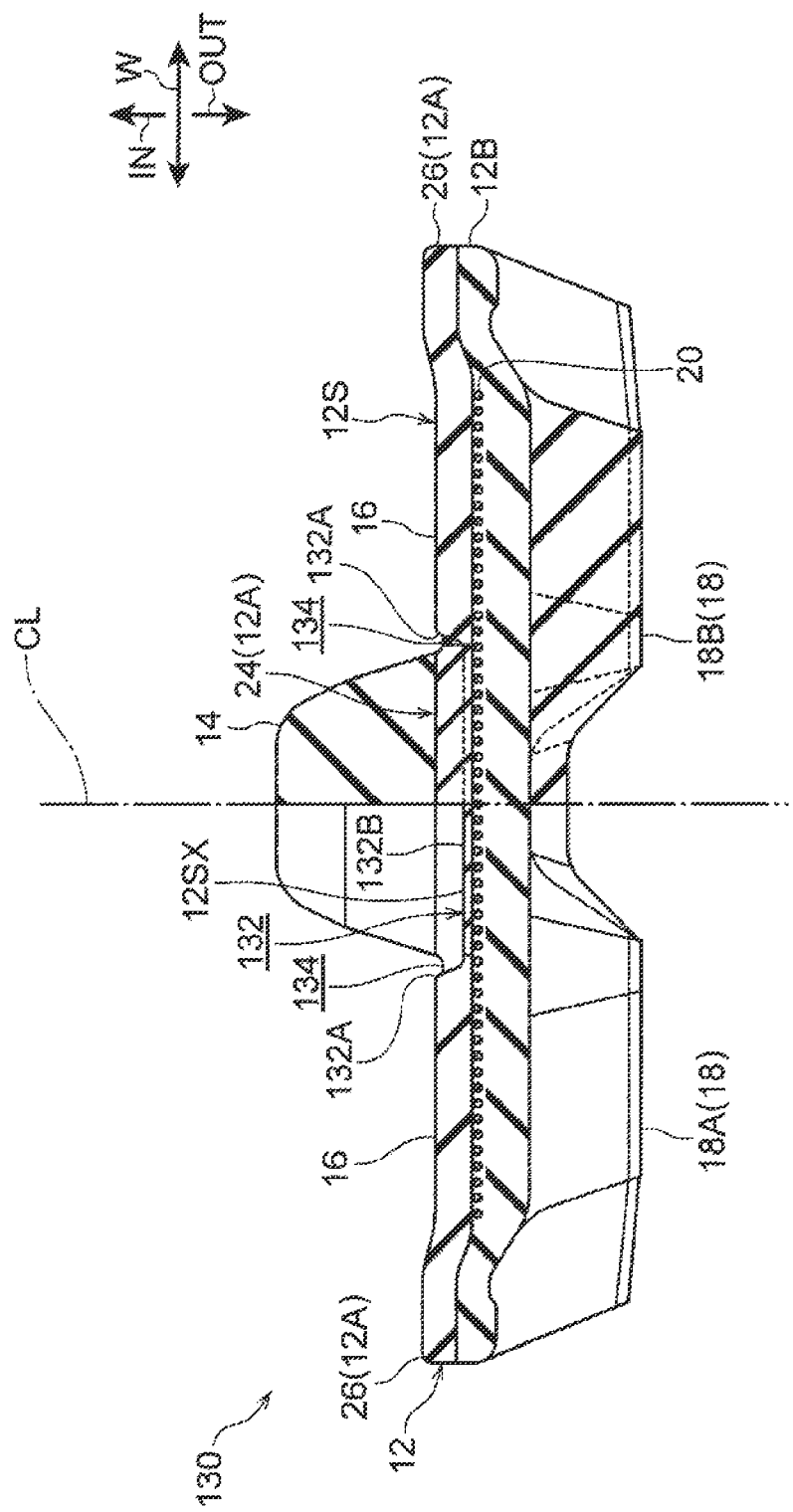

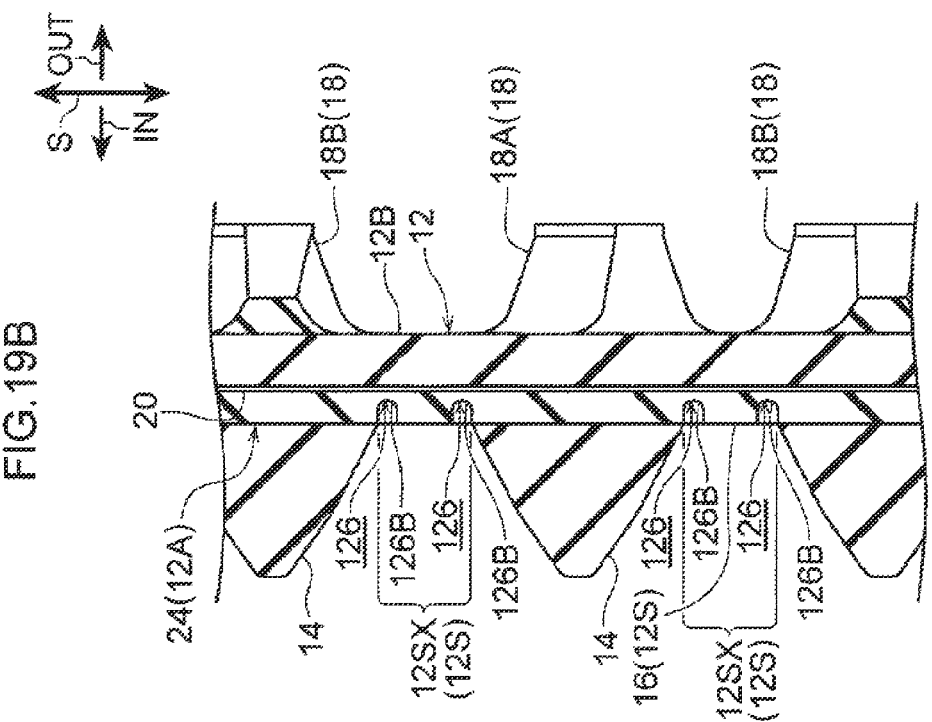
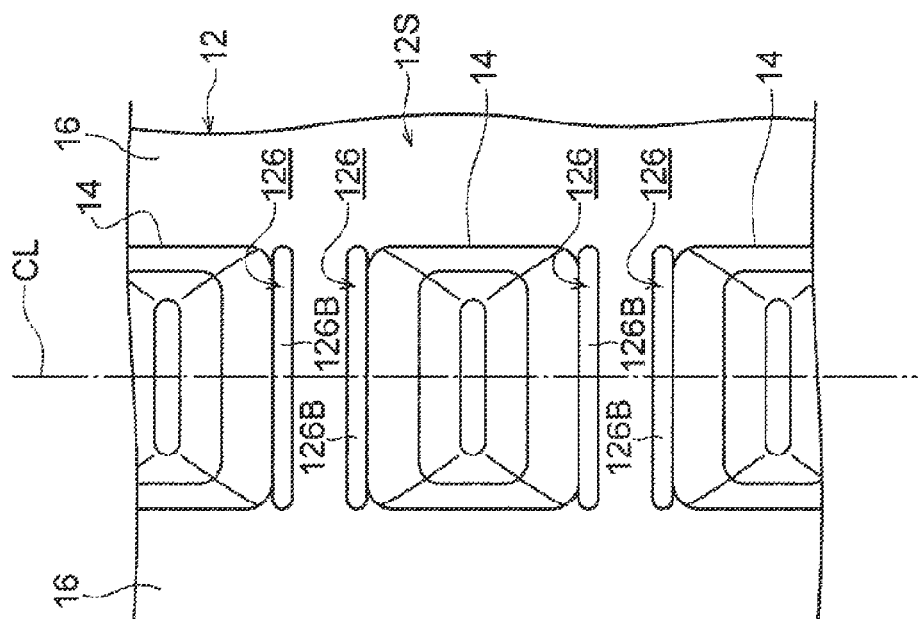

RUBBER CRAWLER

CROSS REFERENCE TO RELATED APPLICATIONS

This application is a National Stage of International Application No. PCT/JP2013/056839 filed Mar. 12, 2013, claiming priority based on Japanese Patent Application Nos. 2012-066177 filed Mar. 22, 2012 and 2012-093100 filed Apr. 16, 2012, the contents of all of which are incorporated herein by reference in their entirety.

TECHNICAL FIELD

The present invention relates to a rubber crawler.

BACKGROUND ART

In recent years, endless rubber crawlers have been used in undercarriages for agricultural machines, construction machines, and earth-moving machines.

Japanese Patent Application Laid-open (JP-A) No. 2006-160069 discloses a rubber crawler having an inner peripheral surface on which rubber projections that engage with a drive wheel of a machine body and to which drive force is input are formed at regular intervals in the crawler circumferential direction. In this rubber crawler, the rubber forming the regions of the inner peripheral surface corresponding to the areas between the rubber projections (below, this rubber will be simply called inner peripheral surface rubber) is formed integrally with the mutually adjacent rubber projections.

SUMMARY OF INVENTION

Technical Problem

In this connection, when the rubber crawler disclosed in JP-A No. 2006-160069 crawls over a rock or a protruding object on the ground, the regions corresponding to the areas between the rubber projections and whose rubber thickness is thin (whose stiffness is low) become reversely bent as a result of being bent in such a way as to become sunken toward the crawler inside. At this time, bending stress acts on the regions corresponding to the areas between the rubber projections of the rubber crawler.

Here, in the rubber crawler disclosed in JP-A No. 2006-160069, the hardness of the rubber projections is increased in consideration of the input of the drive force from the drive wheel, so the hardness of the regions of the inner peripheral surface rubber corresponding to the areas between the rubber projections is also increased. For this reason, depending on the state (bend angle) of the reverse bending, there is the concern that excessive tensile stress (bending stress) will act on the regions of the inner peripheral surface rubber corresponding to the areas between the rubber projections.

It is an object of the present invention to suppress excessive stress from acting on the rubber forming the inner peripheral surface at regions corresponding to the areas between the rubber projections.

Solution to Problem

A rubber crawler of a first aspect of the present invention has: an endless rubber body that is entrained about plural wheels; plural rubber projections that are disposed on the rubber body and spaced apart from one another in a rubber body circumferential direction, project toward an inner peripheral side of the rubber body, and come into contact with the wheels to limit the movement of the wheels in a rubber body width direction; and a low-hardness rubber portion that configures part of an inner peripheral surface of the rubber body, is disposed between mutually adjacent rubber projections, and is formed by a rubber having a lower hardness than the rubber projections.

Advantageous Effects of Invention

As described above, the rubber crawler of the present invention can suppress excessive stress from acting on the rubber forming the inner peripheral surface at regions corresponding to the areas between the rubber projections.

BRIEF DESCRIPTION OF DRAWINGS

FIG. 16 is a plan view of the rubber crawler of the fifth embodiment as seen from the inner peripheral side;

FIG. 17 is a sectional view taken along line 17X-17X of FIG. 16;

FIG. 19A is a plan view of a rubber crawler having recessed portions pertaining to a second example modification of the fourth embodiment as seen from the inner peripheral side; and FIG. 19B is a sectional view of the rubber crawler having the recessed portions pertaining to the second example modification of the fourth embodiment as cut along the centerline passing through the center in the crawler width direction.

DESCRIPTION OF EMBODIMENTS

First Embodiment

A rubber crawler pertaining to a first embodiment of the present invention will be described below using FIG. 1 to FIG. 6. An endless crawler 10 serving as an example of the rubber crawler pertaining to the first embodiment is a so-called metal coreless rubber crawler that does not have metal cores.

Figure 1:
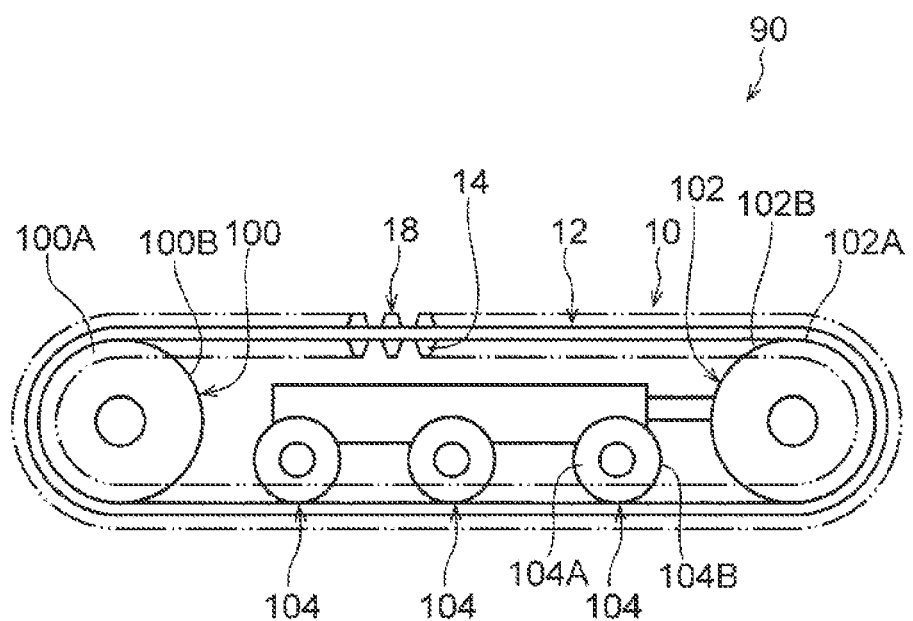
FIG. 1 is a side view of a rubber crawler of a first embodiment as seen from the crawler width direction.

As shown in FIG. 1, the rubber crawler 10 is entrained about a drive wheel 100, which is coupled to a drive shaft of a crawler vehicle serving as a machine body, and an idler wheel 102, which is attached to the crawler vehicle in such a way that the idler wheel 102 may freely rotate, and used. Furthermore, plural roller wheels 104 disposed between the drive wheel 100 and the idler wheel 102 and attached to the crawler vehicle in such a way that the roller wheels 104 may freely rotate are configured to roll on the inner periphery of the rubber crawler 10. The drive wheel 100, the idler wheel 102, and the roller wheels 104 are examples of wheels of the present invention.

In the present embodiment, the circumferential direction of the endless rubber crawler 10 (the direction indicated by arrow S in FIG. 3 and FIG. 4) will be called the "crawler circumferential direction" and the width direction of the rubber crawler 10 (the direction indicated by arrow W in FIG. 3 and FIG. 4) will be called the "crawler width direction." The crawler circumferential direction and the crawler width direction are orthogonal to one another when the rubber crawler 10 is seen from its outer peripheral side or its inner peripheral side.

Figure 5:
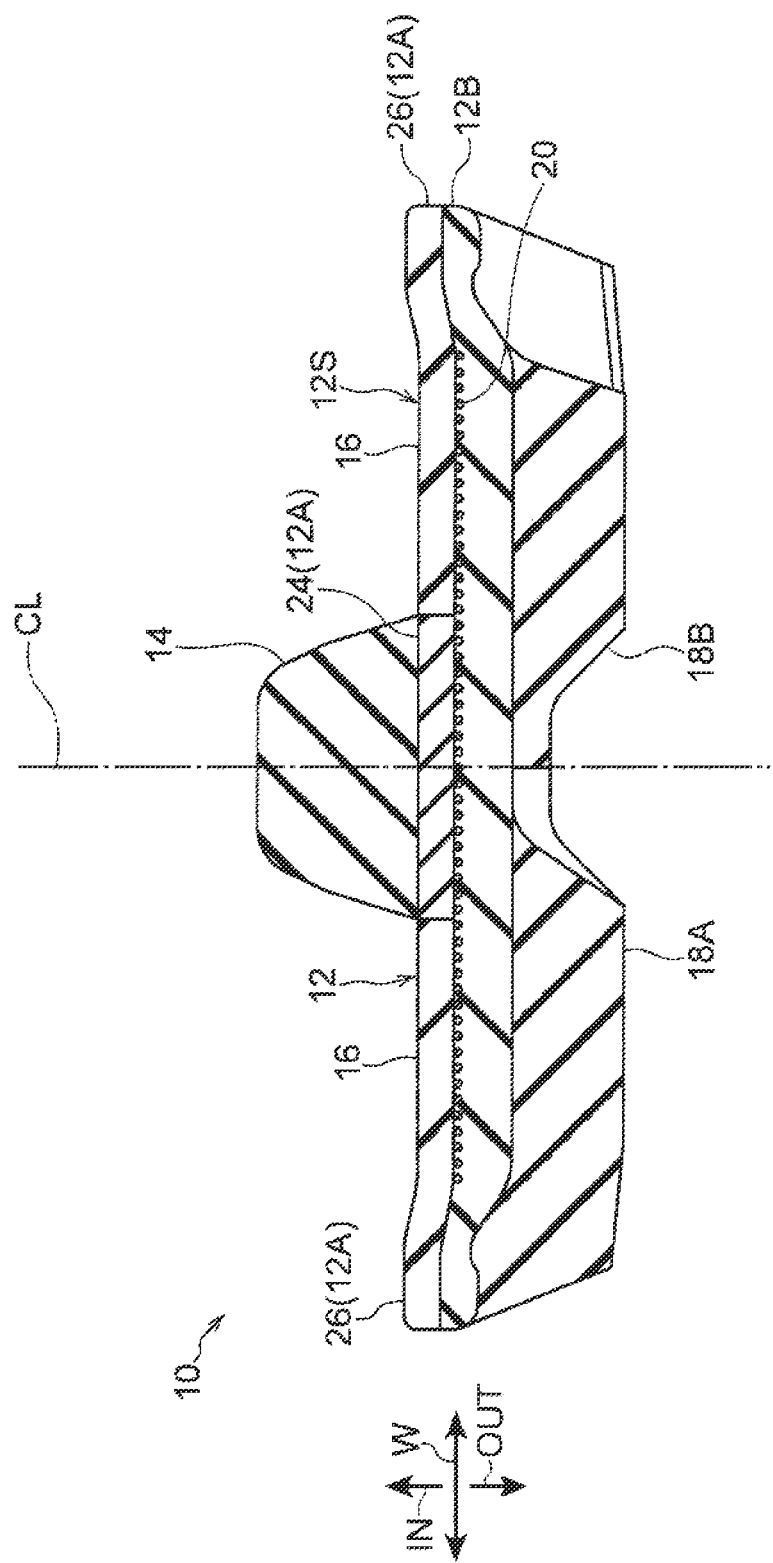
FIG. 5 is a sectional view taken along line 5X-5X of FIG. 4.
Figure 6:
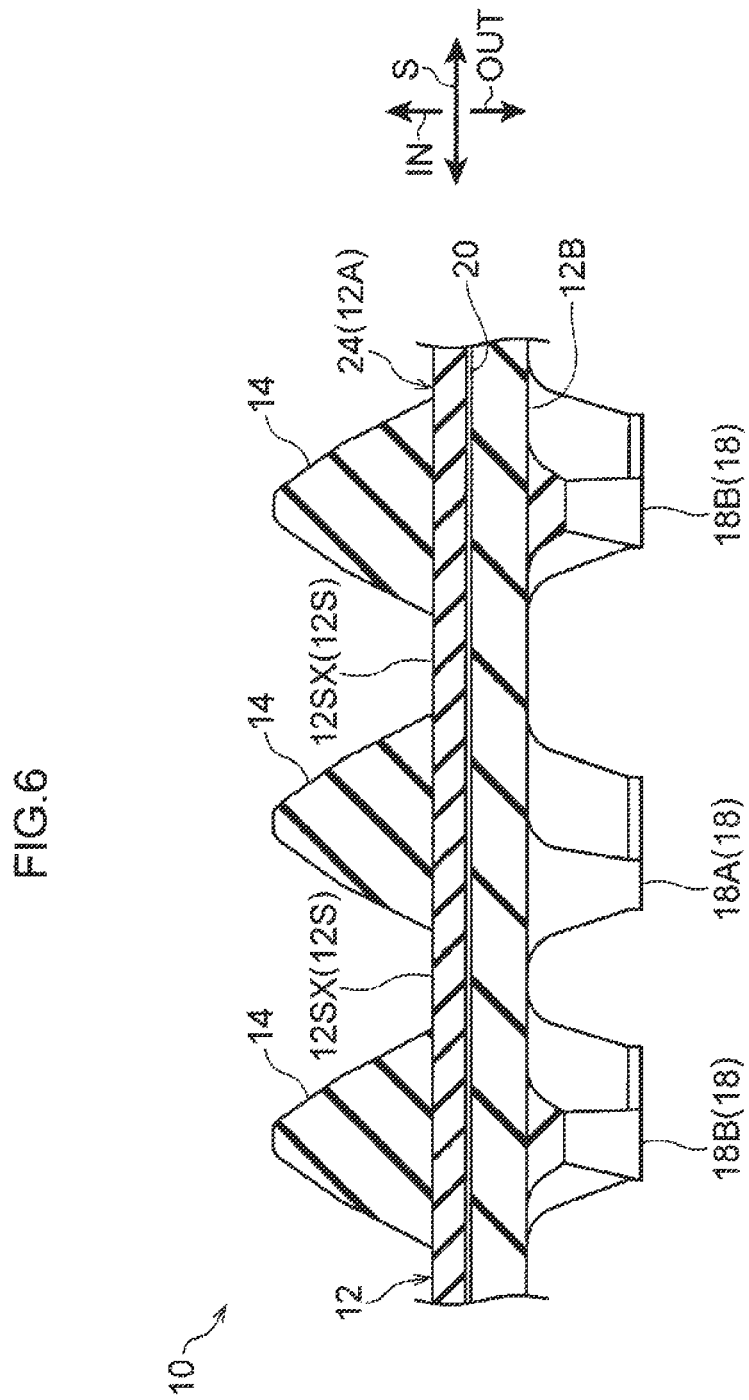
FIG. 6 is a side sectional view of the rubber crawler of the first embodiment as cut in the center in the crawler width direction.

Furthermore, in the present embodiment, the inner peripheral side of the rubber crawler 10 (the directional side indicated by arrow IN in FIG. 5 and FIG. 6) forming a loop as a result of being entrained about the drive wheel 100, the idler wheel 102, and the roller wheels 104 will be called the "crawler inner peripheral side" and the outer peripheral side of the rubber crawler 10 (the directional side indicated by arrow OUT in FIG. 5 and FIG. 6) will be called the "crawler outer peripheral side." The direction of arrow IN (the direction inside the loop) and the direction of arrow OUT (the direction outside the loop) in FIG. 5 and FIG. 6 indicate inner and outer directions of the entrained rubber crawler 10.

Furthermore, the present embodiment is given a configuration where the rubber crawler 10 is entrained about the drive wheel 100 and the idler wheel 102, but the present invention is not limited to this configuration, and depending on the arrangement of the drive wheel 100, the idler wheel 102, and the plural roller wheels 104, it may also be given a configuration where the rubber crawler 10 is entrained about one or plural roller wheels 104 in addition to the drive wheel 100 and the idler wheel 102.

As shown in FIG. 1, a crawler traveling device 90 pertaining to the first embodiment and serving as an undercarriage of the crawler vehicle is configured by the drive wheel 100, the idler wheel 102, the roller wheels 104, and the rubber crawler 10 entrained about the drive wheel 100 and the idler wheel 102.

As shown in FIG. 1, the drive wheel 100 has a pair of disc-shaped wheel portions 100A that are coupled to the drive shaft of the crawler vehicle. Outer peripheral surfaces 100B of the wheel portions 100A are configured to contact and roll on later-described wheel rolling surfaces 16 of the rubber crawler 10. Furthermore, pin portions (not shown in the drawings) are formed on the pair of wheel portions 100A at regular intervals in the circumferential direction in such a way as to bridge the peripheral edge portions of the wheel portions 100A. The pin portions are configured to engage (mesh) with later-described rubber projections 14, and the pin portions are configured to transmit drive force from the crawler vehicle to the rubber crawler 10 by engaging with the rubber projections 14. The rubber crawler 10 to which the drive force has been transmitted in this way circulates between the drive wheel 100 and the idler wheel 102. Additionally, because of the circulation of the rubber crawler 10, later-described lugs 18 grip the ground, whereby the crawler vehicle having the crawler traveling device 90 moves (travels).

The idler wheel 102 has a pair of disc-shaped wheel portions 102A that are attached to the crawler vehicle in such a way that the wheel portions 102A may freely rotate. Outer peripheral surfaces 102B of the wheel portions 102A are configured to contact the later-described wheel rolling surfaces 16 of the rubber crawler 10. Furthermore, the idler wheel 102 is pressed in the direction away from the drive wheel 100 by a hydraulic or other pressure applying mechanism with which the crawler vehicle is equipped, and the idler wheel 102 is pressed against the wheel rolling surfaces 16 of the rubber crawler 10 to hold tension in the rubber crawler 10.

The roller wheels 104 support the weight of the crawler vehicle and have disc-shaped wheel portions 104A that are attached to the crawler vehicle in such a way that the wheel portions 104A may freely rotate. Outer peripheral surfaces 104B of the wheel portions 104A are configured to contact the later-described wheel rolling surfaces 16 of the rubber crawler 10.

The idler wheel 102 and the roller wheels 104 are configured to rotate following the rubber crawler 10 circulating between the drive wheel 100 and the idler wheel 102.

As shown in FIG. 1, the rubber crawler 10 has a rubber belt 12 comprising a rubber material formed in an endless belt. The rubber belt 12 of the present embodiment is an example of an endless rubber body of the present invention. Furthermore, the circumferential direction, the width direction, the inner peripheral side, and the outer peripheral side of the rubber belt 12 of the present embodiment coincide with the crawler circumferential direction, the crawler width direction, the crawler inner peripheral side, and the crawler outer peripheral side, respectively.

Figure 2:
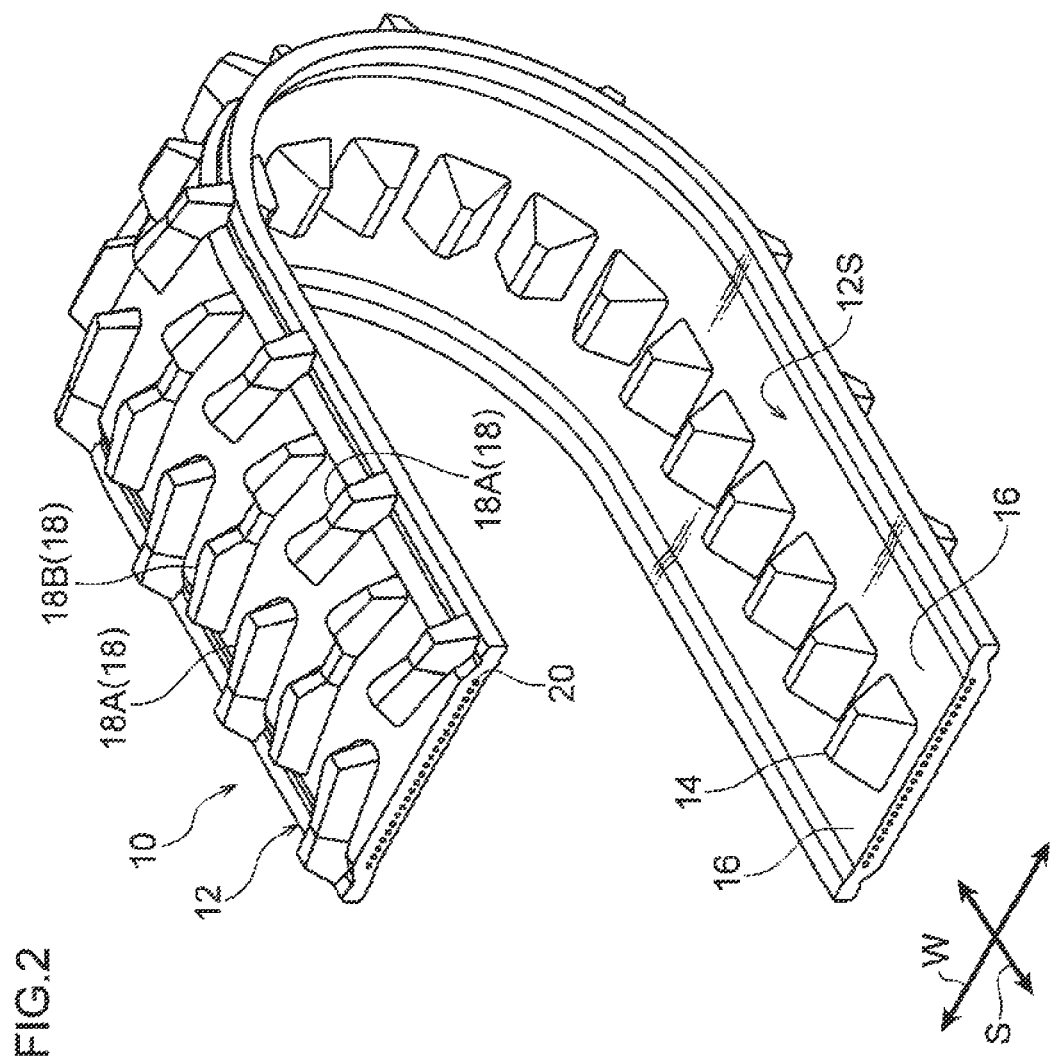
FIG. 2 is a perspective view including a partial section of the rubber crawler of the first embodiment.
Figure 3:
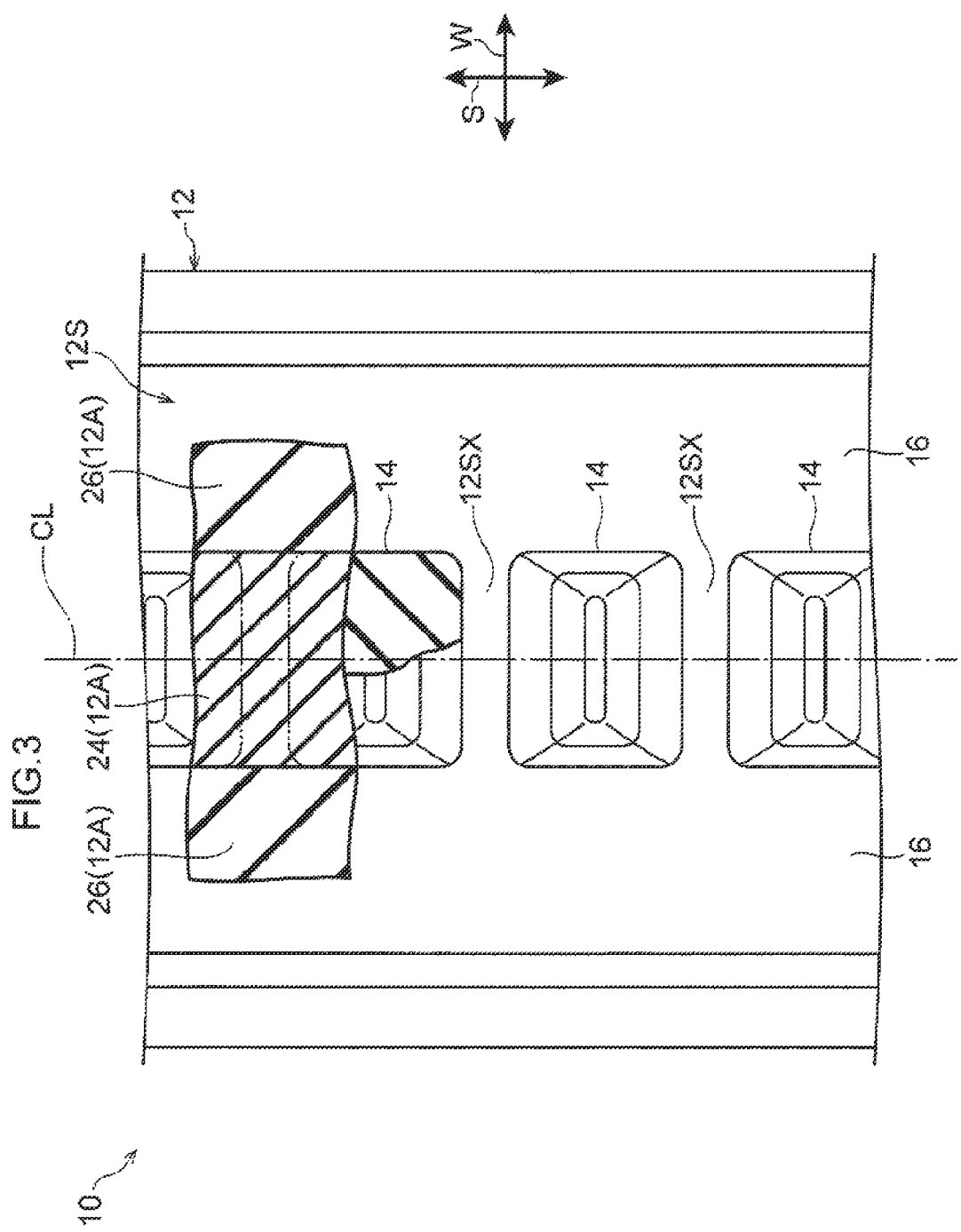
FIG. 3 is a plan view of the rubber crawler of the first embodiment as seen from the inner peripheral side.

As shown in FIGS. 1 to 3, plural rubber projections 14 that project toward the crawler inner peripheral side are formed on the inner periphery (specifically, an inner peripheral surface 12S) of the rubber belt 12 at intervals apart from one another in the crawler circumferential direction. The rubber projections 14 are disposed in the crawler width direction center of the rubber belt 12 and are configured to come into contact with the wheels rolling on the later-described wheel rolling surfaces 16 to thereby limit the movement of the wheels in the crawler width direction. Specifically, the side surfaces of the wheels are configured to come into contact with the crawler width direction side wall surfaces of the rubber projections 14.

Furthermore, in the present embodiment, the hardness of the rubber projections 14 that contact the wheels is set in the range of 80 to 90. "Hardness" in the present specification is hardness as defined in JIS K 6253 (Durometer Type A).

As shown in FIG. 2 and FIG. 3, wheel rolling surfaces 16 that extend along the crawler circumferential direction are formed on both crawler width direction sides of the rubber projections 14 of the rubber belt 12. The wheel rolling surfaces 16 are flat and configure part of the inner peripheral surface 12S of the rubber belt 12. Furthermore, the drive wheel 100, the idler wheel 102, and the roller wheels 104 are configured to roll on the wheel rolling surfaces 16.

Figure 4:
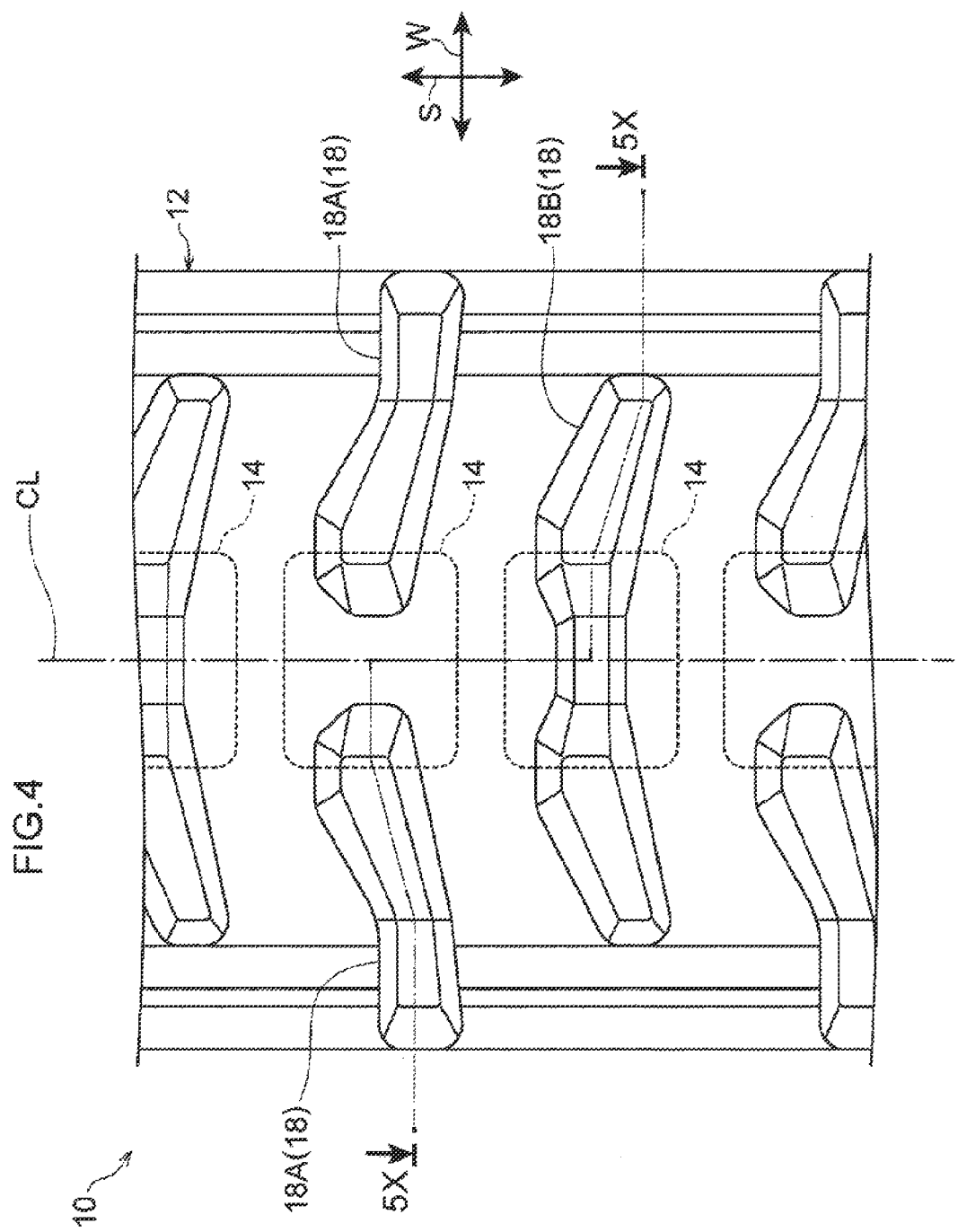
FIG. 4 is a plan view of the rubber crawler of the first embodiment as seen from the outer peripheral side.

As shown in FIG. 4 and FIG. 5, block-like lugs 18 that project toward the crawler outer peripheral side and contact the ground are formed on the outer periphery of the rubber belt 12. As shown in FIG. 4, the lugs 18 are configured by pairs of lugs 18A that are disposed on right and left sides of a centerline CL and pairs of lugs 18B that are disposed across the centerlines CL, and the lugs 18A and the lugs 18B are alternately formed in the crawler circumferential direction. Furthermore, the lugs 18A and the lugs 18B are both disposed in such a way that parts of them lie on top of the crawler outer peripheral sides of the rubber projections 14.

As shown in FIG. 5 and FIG. 6, an endless belt-like main cord layer 20 that extends along the crawler circumferential direction is embedded in the rubber belt 12. The main cord layer 20 is formed by covering one main cord spirally wound along the crawler circumferential direction in rubber or by arranging in parallel (arranging in parallel in the crawler width direction) plural main cords running along the crawler circumferential direction and covering the plural main cords in rubber.

In the present embodiment, a steel cord(s), which has superior tensile strength, is used as the main cord(s), but the present invention is not limited to this configuration and may also use, as the main cord(s), an organic fiber cord(s) configured by organic fiber (e.g., nylon fiber, aromatic polyamide fiber, etc.) provided that it has sufficient tensile strength.

In the present embodiment, one main cord layer 20 is embedded in the rubber belt 12, but the present invention is not limited to this configuration and may also be given a configuration where one or plural intersecting cord layers formed as a result of intersecting cords that intersect the main cord(s) being arranged in parallel in the crawler circumferential direction and covered in rubber are layered on at least one of the crawler inner peripheral side and outer peripheral side of the main cord layer 20.

As shown in FIG. 5, the rubber belt 12 of the present embodiment is configured by an inner peripheral side rubber portion 12A on the crawler inner peripheral side and an outer peripheral side rubber portion 12B on the crawler outer peripheral side. In the present embodiment, the surface (the surface on the crawler inner peripheral side) of the inner peripheral side rubber portion 12A forms the inner peripheral surface 12S. Furthermore, the inner peripheral surface (parts of the inner peripheral surface 12S) at regions corresponding to the areas between the mutually adjacent rubber projections 14 of the rubber belt 12 are denoted by reference sign 12SX.

The inner peripheral side rubber portion 12A is configured by a low-hardness rubber portion 24, which forms the crawler width direction center portion of the inner peripheral side rubber portion 12A, and outside rubber portions 26, which form the regions of the inner peripheral side rubber portion 12A on both crawler width direction outer sides of the low-hardness rubber portion 24.

Furthermore, as shown in FIG. 6, the low-hardness rubber portion 24 and the outside rubber portions 26 both extend continuously in the crawler circumferential direction. In the present embodiment, as shown in FIG. 5 and FIG. 6, the rubber projections 14 are disposed on the low-hardness rubber portion 24. For this reason, as shown in the plan view of FIG. 3, the low-hardness rubber portion 24 is disposed between the mutually adjacent rubber projections 14. That is, in the present embodiment, the surface (the surface exposed to the crawler inner peripheral side) of the low-hardness rubber portion 24 forms the inner peripheral surfaces 12SX.

The low-hardness rubber portion 24 is formed by a rubber having a lower hardness than the rubber projections 14. Specifically, the hardness of the low-hardness rubber portion 24 is set in the range of 78 to 88.

Furthermore, it is preferred that the difference in hardness between the rubber projections 14 and the low-hardness rubber portion 24 be set equal to or less than 12. This is because if the difference in hardness exceeds 12, it becomes easier for cracks to occur (at the boundaries) between the rubber projections 14 and the low-hardness rubber portion 24 due to the difference in hardness (here, having the same meaning as difference in stiffness).

The outside rubber portions 26 are formed by a rubber having a lower hardness than the low-hardness rubber portion 24. Specifically, the hardness of the outside rubber portions 26 is set in the range of 68 to 78.

The present embodiment is given a configuration where the hardness of the outside rubber portions 26 is lower than that of the low-hardness rubber portion 24, but the present invention is not limited to this configuration and may also be given a configuration where the low-hardness rubber portion 24 and the outside rubber portions 26 have the same hardness or where the hardness of the outside rubber portions 26 is higher than that of the low-hardness rubber portion 24. Furthermore, the rubber forming the low-hardness rubber portion 24 and the rubber forming the outside rubber portions 26 may, of course, also have the same hardness but different rubber properties depending on their required performance.

Furthermore, in the present embodiment, the wheel rolling surfaces 16 are formed on the outside rubber portions 26.

The rubber forming the low-hardness rubber portion 24 contains a rubber component, a novolac phenolic resin, and a hardener for the novolac phenolic resin.

As the rubber component, for example, known natural rubbers, synthetic rubbers such as butadiene rubber, styrene-butadiene rubber, isoprene rubber, ethylene-propylene-diene rubber, butyl rubber, halogenated butyl rubber, chloroprene rubber, isobutylene-isoprene rubber, acrylonitrile-butadiene rubber, silicone rubber, acrylic rubber, epoxidized natural rubber, and acrylate-butadiene rubber, and rubbers obtained by modifying the molecular chain ends of these natural rubbers and synthetic rubbers can be used, and it suffices to appropriately select one or two or more types from among these.

The novolac phenolic resin is blended in order to raise the stiffness and improve the elongation of the rubber, and is a solid resin obtained by condensation polymerizing phenol or modified phenol and formaldehyde in such a way that the ratio (mole ratio) of formaldehyde to phenol usually falls in the range of 0.6 to 1.0. The melting point of the resin is in the range of 50 to 120° C.

Specific examples of the novolac phenolic resin include straight phenol, alkyl-substituted phenol, and oil-modified phenol.

Furthermore, it is preferred that the blending amount of the novolac phenolic resin be set to 5 to 20 parts by mass with respect to 100 parts by mass of the rubber component. When the blending amount exceeds 20 parts by mass, the stiffness of the rubber becomes too high and the rubber has poor flexibility, so there is the concern that this will lead to a worsening of fatigue resistance, and when the blending amount is less than 5 parts by mass, there is the concern that a sufficient stiffness improving effect will not be obtained.

As the hardener for the novolac phenolic resin, compounds known as hardeners for novolac phenolic resins can be used, and the hardener is not particularly limited, but in the present embodiment hexamethylenetetramine is used.

It is preferred that the blending amount of the hardener be set to 5 to 20 parts by mass with respect to 100 parts by mass of the novolac phenolic resin. When the blending amount exceeds 20 parts by mass, there is the concern that fatigue resistance will become lower, and when the blending amount is less than 5 parts by mass, there is the concern that hardening will not progress sufficiently and the necessary stiffness will not be able to be achieved.

Next, the action and effects of the rubber crawler 10 of the present embodiment will be described.

In the rubber crawler 10, the inner peripheral surfaces 12SX are formed by a rubber having a lower hardness than the rubber projections 14, or in other words the inner peripheral surfaces 12SX are formed by the low-hardness rubber portion 24, so, for example, compared to a rubber crawler where the inner peripheral surfaces 12SX are formed by a rubber having the same hardness as the rubber projections 14, it is easier for the regions corresponding to the areas between the rubber projections 14 to undergo bending deformation (elastic deformation).

Here, even if the rubber crawler 10 crawls over a rock or a protruding object on the ground and becomes reversely bent so that tensile stress (bending stress) acts on the crawler inner peripheral side of the regions corresponding to the areas between the rubber projections 14 of the rubber belt 12, the rubber forming the inner peripheral surfaces 12SX elastically deforms (elongates), so excessive tensile stress can be suppressed from acting on the rubber forming the inner peripheral surfaces 12SX.

"Reverse bending" here means bending in the opposite direction with respect to the bending direction when the rubber crawler 10 has been entrained about the drive wheel 100 and the idler wheel 102.

Furthermore, in the rubber crawler 10, the inner peripheral surfaces 12SX of regions corresponding to the areas between the rubber projections 14 that mainly undergo bending deformation when the rubber crawler 10 has been entrained about the drive wheel 100 and the idler wheel 102 are formed by a rubber (the rubber forming the low-hardness rubber portion 24) having a lower hardness than the rubber projections 14, so the resistance of the rubber crawler 10 to entrainment about the drive wheel 100 and the idler wheel 102 can be reduced.

In particular, in the rubber crawler 10, the outside rubber portions 26 of the rubber belt 12 are formed by a rubber having a lower hardness than the low-hardness rubber portion 24, so the resistance of the rubber crawler 10 to entrainment about the drive wheel 100 and the idler wheel 102 can be further reduced.

When the entrainment resistance of the rubber crawler 10 is reduced in this way, the energy loss of the crawler vehicle is reduced and fuel economy is improved. Furthermore, the engagement (meshing) between the pin portions of the drive wheel 100 and the rubber projections 14 of the rubber crawler 10 is improved.

Furthermore, in the rubber crawler 10, the rubber projections 14 are disposed on the low-hardness rubber portion 24, so it is ensured that the boundaries between the rubber projections 14 and the low-hardness rubber portion 24 do not face the inside of the rubber belt 12. Because of this, even if cracks were to occur due to the difference in hardness between the rubber projections 14 and the low-hardness rubber portion 24, the cracks would not progress inside the rubber belt 12, so the durability of the rubber belt 12 can be ensured. Furthermore, deterioration of the main cord layer 20 caused by cracks progressing inside the rubber belt 12 can be suppressed.

Moreover, at the time of manufacture of the rubber crawler 10, unvulcanized belt-like low-hardness rubber that becomes the low-hardness rubber portion 24 is disposed and thereafter unvulcanized belt-like outside rubber that becomes the outside rubber portions 26 is disposed on both sides thereof, so the positioning of the belt-like low-hardness rubber becomes easy. Additionally, unvulcanized rubber chunks that become the rubber projections 14 are disposed at regular intervals on the unvulcanized belt-like low-hardness rubber and are vulcanized, so the positioning of the rubber chunks becomes easy. For this reason, the manufacture of the rubber crawler 10 becomes easy.

The rubber forming the low-hardness rubber portion 24 contains the novolac phenolic resin and the hardener for the novolac phenolic resin, so the hardness of the low-hardness rubber portion 24 is ensured and its elongation is improved.

Furthermore, hexamethylenetetramine is used as the hardener for the novolac phenolic resin contained in the rubber forming the low-hardness rubber portion 24, so the fatigue resistance of the low-hardness rubber portion 24 is improved. Because of this, even when bending stress such as bending and reverse bending repeatedly acts on the regions corresponding to the areas between the rubber projections 14 of the rubber crawler 10, trouble can be suppressed from occurring in the low-hardness rubber portion 24.

Moreover, sometimes, due to prolonged storage, the sections of the rubber crawler 10 that had been entrained about the drive wheel 10 and the idler wheel 102 retain their entrained shape along the outer peripheries of the drive wheel 100 and the idler wheel 102. When the sections retaining their entrained shape in this way are extended, tensile stress acts on the crawler inner peripheral side of the regions corresponding to the areas between the rubber projections 14 of the rubber belt 12, but because the inner peripheral surfaces 12SX of regions corresponding to the areas between the rubber projections 14 are formed by the low-hardness rubber portion 24 and durability and fatigue resistance are improved as a result of the low-hardness rubber portion 24 containing the novolac phenolic resin and the hardener for the novolac phenolic resin, excessive stress (tensile stress) can be suppressed from acting on the inner peripheral surfaces 12SX of regions corresponding to the areas between the rubber projections 14, and trouble can be suppressed from occurring in the low-hardness rubber portion 24.

In the first embodiment, the inner peripheral side rubber portion 12A is configured by the low-hardness rubber portion 24 and the outside rubber portions 26, but the present invention is not limited to this configuration, and depending on their required functions, each of the regions of the inner peripheral side rubber portion 12A may also be formed by rubbers having different hardnesses. For example, the rubber forming the wheel rolling surfaces 16 on which the wheels roll may also be formed by a harder rubber than the low-hardness rubber portion 24.

Second Embodiment

Next, a rubber crawler of a second embodiment pertaining to the present invention will be described with reference to FIG. 7. The same reference signs will be assigned to configurations that are the same as those of the first embodiment, and description of those same configurations will be omitted.

Figure 7:
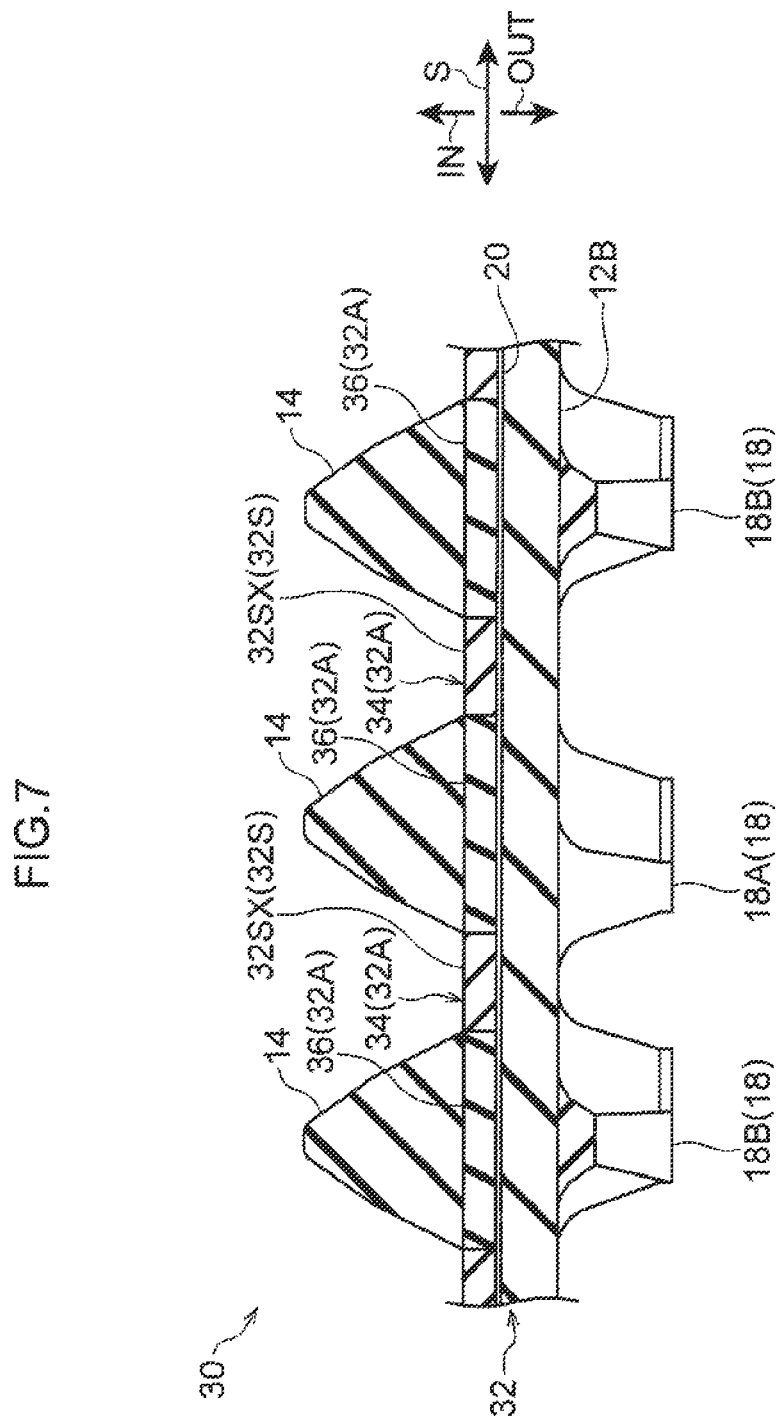
FIG. 7 is a side sectional view of a rubber crawler of a second embodiment as cut in the center in the crawler width direction.

As shown in FIG. 7, a rubber crawler 30 of the present embodiment has the same configuration as that of the rubber crawler 10 of the first embodiment except for the configuration of the inner peripheral side rubber portion of the rubber belt. For this reason, the configuration of an inner peripheral side rubber portion 32A will be described below.

As shown in FIG. 7, a rubber belt 32 of the present embodiment is configured by an inner peripheral side rubber portion 32A on the crawler inner peripheral side and an outer peripheral side rubber portion 12B (which is the same as the outer peripheral side rubber portion 12B of the first embodiment) on the crawler outer peripheral side. In the present embodiment, the surface (the surface on the crawler inner peripheral side) of the inner peripheral side rubber portion 32A forms an inner peripheral surface 32S of the rubber belt 32. Furthermore, the inner peripheral surfaces 32SX (parts of the inner peripheral surface 32S) of regions corresponding to the areas between the mutually adjacent rubber projections 14 of the rubber belt 32 are denoted by reference sign 32SX.

The inner peripheral side rubber portion 32A is configured by low-hardness rubber portions 34 that form the areas between the mutually adjacent rubber projections 14 and outside rubber portions 36 that form the other sections, and the rubber projections 14 are disposed on the outside rubber portions 36. The low-hardness rubber portions 34 are formed by the same rubber as the low-hardness rubber portion 24 of the first embodiment, and the outside rubber portions 36 are formed by the same rubber as the outside rubber portions 26 of the first embodiment. In the present embodiment, the entire inner peripheral surfaces 32SX are formed by the low-hardness rubber portions 34.

Next, the action and effects of the rubber crawler 30 of the second embodiment will be described. Description of action and effects of the present embodiment that are the same as the action and effects of the first embodiment will be appropriately omitted.

In the rubber crawler 30, as shown in FIG. 7, the inner peripheral surfaces 32SX between the mutually adjacent rubber projections 14 of the rubber belt 32 are formed by just the low-hardness rubber portions 34, so the use amount of the rubber containing the novolac phenolic resin and the hardener (hexamethylenetetramine) for the novolac phenolic resin can be reduced. Because of this, the product cost of the rubber crawler 30 can be kept down.

In the second embodiment, as shown in FIG. 7, the entire inner peripheral surfaces 32SX between the mutually adjacent rubber projections 14 of the rubber belt 32 are formed by the low-hardness rubber portions 34, but the present invention is not limited to this configuration, and parts of the inner peripheral surfaces 32SX may also be formed by the low-hardness rubber portions. For example, the crawler circumferential direction center portions of the inner peripheral surfaces 32SX between the rubber projections 14 of the rubber belt 32 may also be configured by low-hardness rubber portions extending along the crawler width direction.

Third Embodiment

Next, a rubber crawler of a third embodiment pertaining to the present invention will be described with reference to FIG. 8. The same reference signs will be assigned to configurations that are the same as those of the first embodiment, and description of those same configurations will be omitted.

Figure 8:
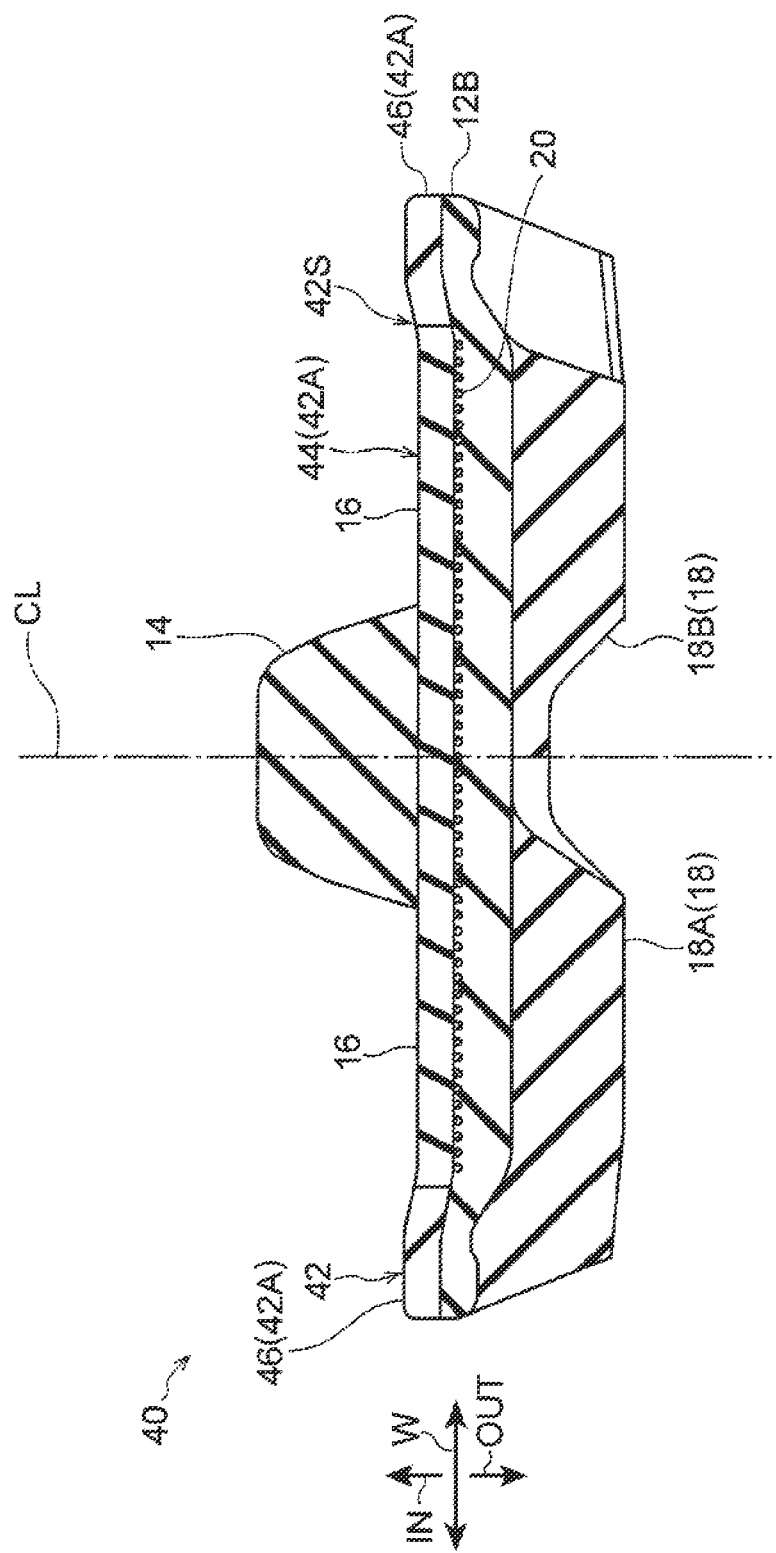
FIG. 8 is a sectional view of a rubber crawler of a third embodiment along the crawler width direction (corresponding to a section taken along line 5X-5X of FIG. 4)

As shown in FIG. 8, a rubber crawler 40 of the present embodiment has the same configuration as that of the rubber crawler 10 of the first embodiment except for the configuration of the inner peripheral side rubber portion of the rubber belt. For this reason, the configuration of an inner peripheral side rubber portion 42A will be described below.

As shown in FIG. 8, a rubber belt 42 of the present embodiment is configured by an inner peripheral side rubber portion 42A on the crawler inner peripheral side and an outer peripheral side rubber portion 12B (which is the same as the outer peripheral side rubber portion 12B of the first embodiment) on the crawler outer peripheral side. In the present embodiment, the surface (the surface on the crawler inner peripheral side) of the inner peripheral side rubber portion 42A forms an inner peripheral surface 42S of the rubber belt 42.

The inner peripheral side rubber portion 42A is configured by a low-hardness rubber portion 44, which forms the crawler circumferential direction center portion of the inner peripheral side rubber portion 42A including the wheel rolling surfaces 16, and outside rubber portions 46, which form the regions of the inner peripheral side rubber portion 42A on both crawler width direction outer sides of the low-hardness rubber portion 44.

The low-hardness rubber portion 44 and the outside rubber portions 46 both extend continuously in the crawler circumferential direction, and the rubber projections 14 are disposed on the low-hardness rubber portion 44. In the present embodiment, the inner peripheral surfaces (not shown in the drawings) of regions corresponding to the areas between the mutually adjacent rubber projections 14 of the rubber belt 42 are formed by the low-hardness rubber portion 44.

The low-hardness rubber portion 44 is formed by the same rubber as the low-hardness rubber portion 24 of the first embodiment, and the outside rubber portions 46 are formed by the same rubber as the outside rubber portions 26 of the first embodiment.

Next, the action and effects of the rubber crawler 40 of the third embodiment will be described. Description of action and effects of the present embodiment that are the same as the action and effects of the first embodiment will be appropriately omitted.

In the rubber crawler 40, as shown in FIG. 8, the wheel rolling surfaces 16 are formed by the low-hardness rubber portion 44, which is formed by a rubber having a higher hardness than the outside rubber portions 46, so the progression of wear of the wheel rolling surfaces 16 caused by the rolling of the wheels can be effectively suppressed.

The first to third embodiments use the rubber belts 12, 32, and 42 comprising a rubber material formed in an endless belt as an example of the endless rubber body (an object having rubber elasticity (that is, a rubber elastic body)) of the present invention, but the present invention is not limited to this configuration and may also use an elastomer belt comprising an elastomer material having rubber elasticity formed in an endless belt. In the case of using the elastomer belt, a low-hardness elastomer portion is used as the low-hardness rubber portion (low-hardness rubber elastic body portion) of the present invention, and outside elastomer portions are used as the outside rubber portions (outside rubber elastic body portions).

In the first to third embodiments, the rubber forming each of the low-hardness rubber portions 24, 34, and 44 contains the novolac phenolic resin and hexamethylenetetramine serving as the hardener for the novolac phenolic resin, but the present invention is not limited to this configuration and may also be given a configuration where regions other than the rubber projections 14 and the rubber belt (e.g., the outside rubber portions and the outer peripheral side rubber portion) contain the novolac phenolic resin and hexamethylenetetramine serving as the hardener for the novolac phenolic resin. It is preferred that the blending amount of the novolac phenolic resin with respect to 100 parts by mass of the rubber component and the blending amount of hexamethylenetetramine with respect to 100 parts by mass of the novolac phenolic resin be set in accordance with the conditions required of the rubber projections 14 and the rubber belt.

Fourth Embodiment

Next, a rubber crawler of a fourth embodiment pertaining to the present invention will be described with reference to FIG. 9 to FIG. 14. The same reference signs will be assigned to configurations that are the same as those of the first embodiment, and description of those same configurations will be omitted.

Figure 9:
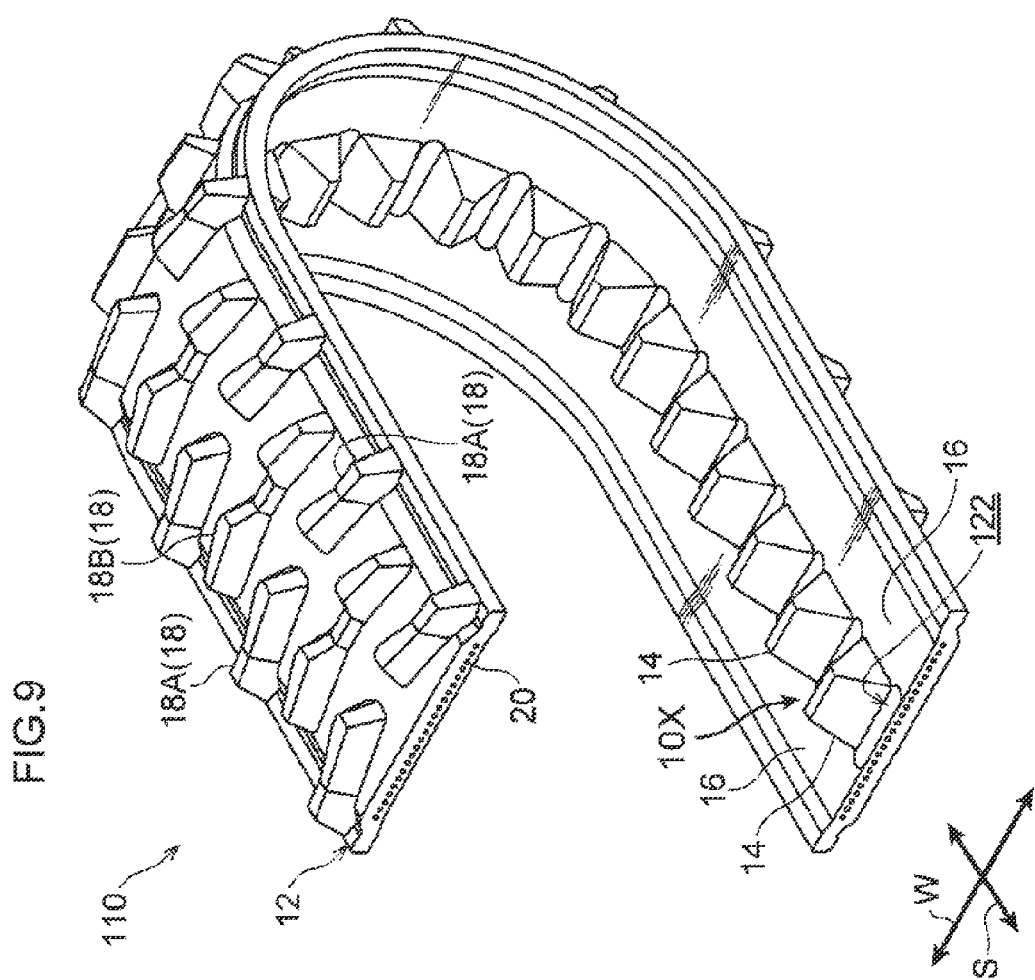
FIG. 9 is a perspective view including a partial section of a rubber crawler of a fourth embodiment.

As shown in FIG. 9, a rubber crawler 110 of the present embodiment has the same configuration as that of the rubber crawler 10 of the first embodiment except for a configuration where recessed portions 122 are formed in the inner peripheral surface 12S of the rubber belt 12. For this reason, the configuration of the recessed portions 122 will be described below.

Figure 10:
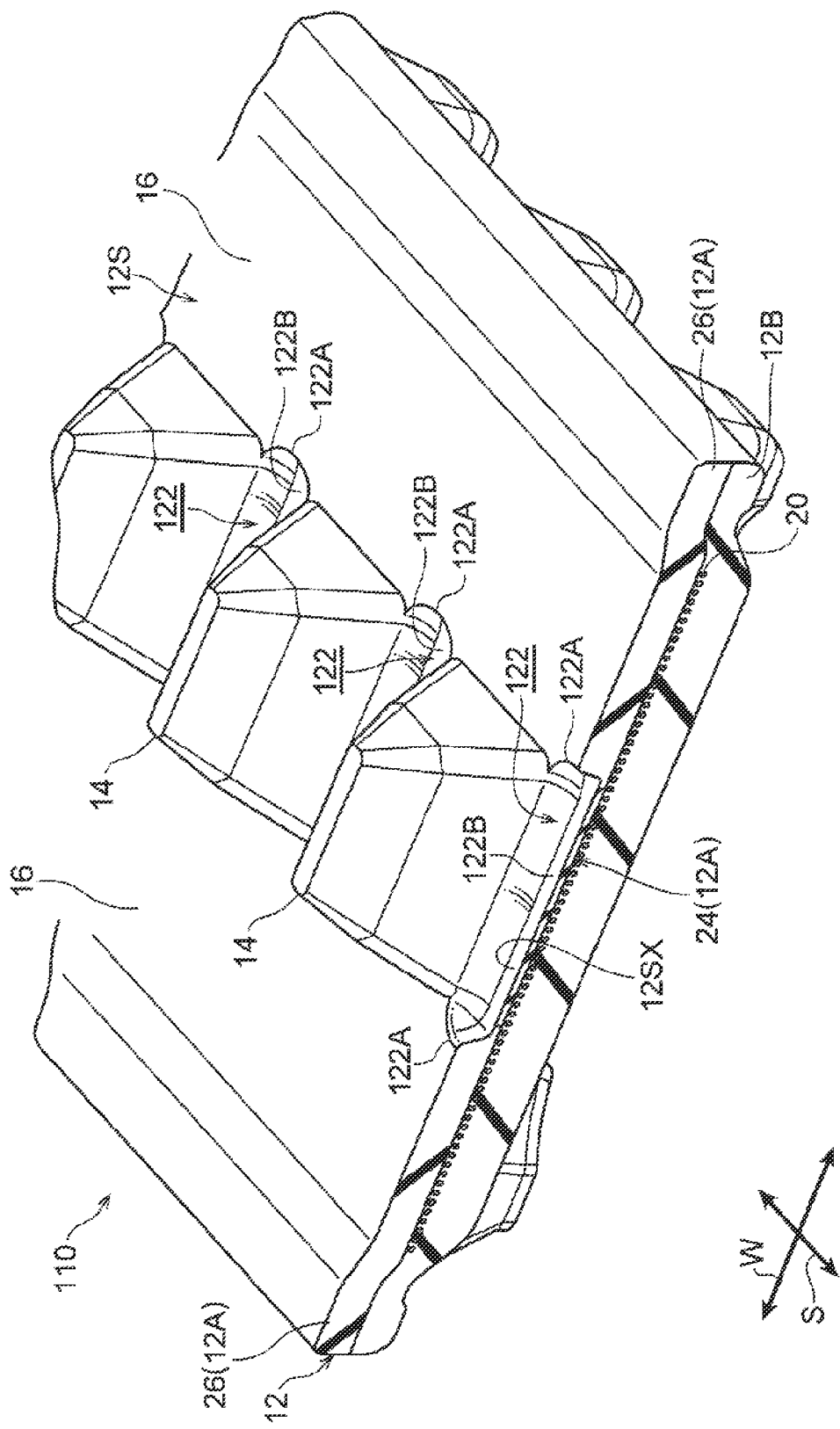
FIG. 10 is an enlarged view of the section indicated by arrow 10X in FIG. 9.
Figure 11:
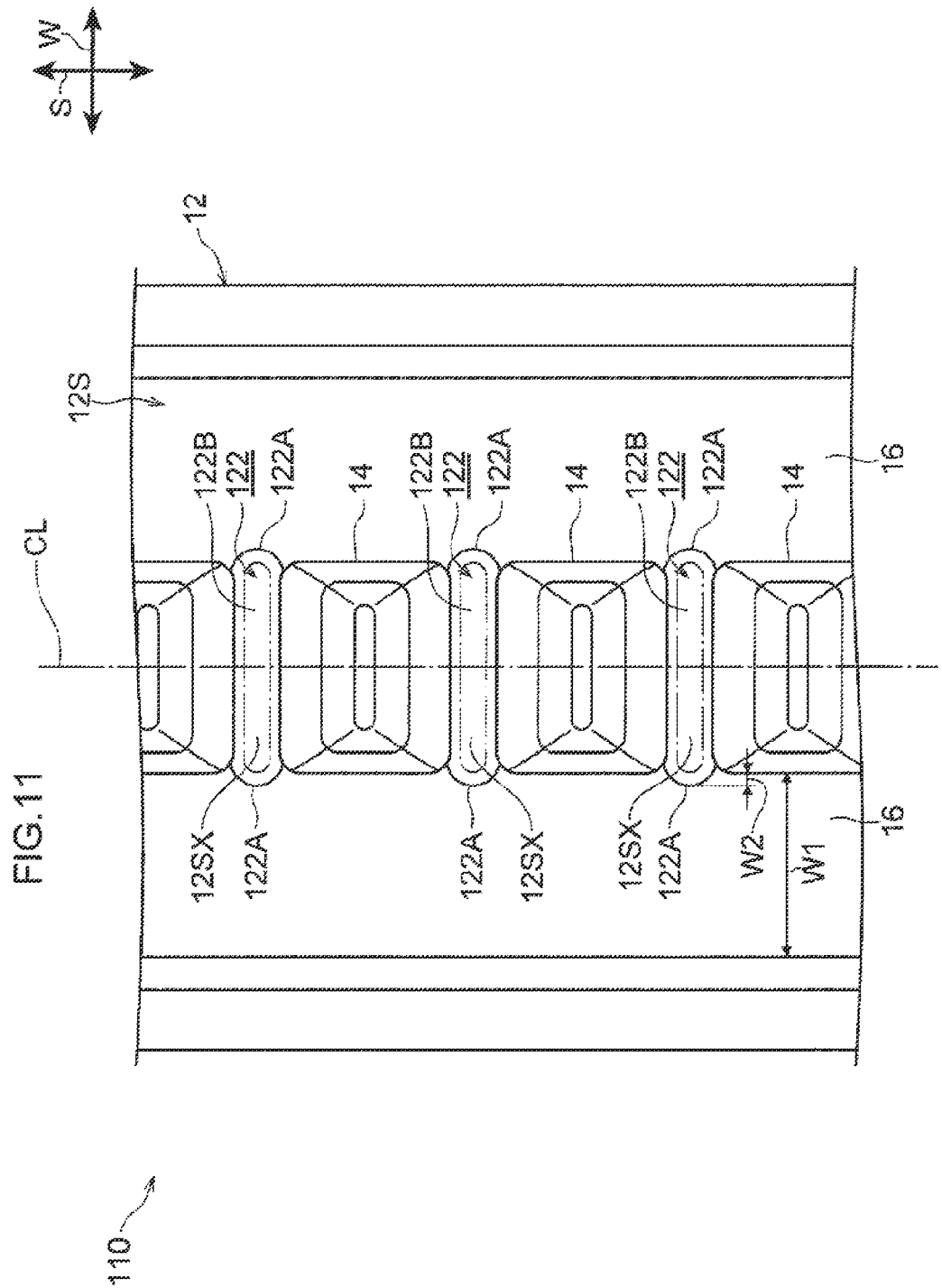
FIG. 11 is a plan view of the rubber crawler of the fourth embodiment as seen from the inner peripheral side.
Figure 12:
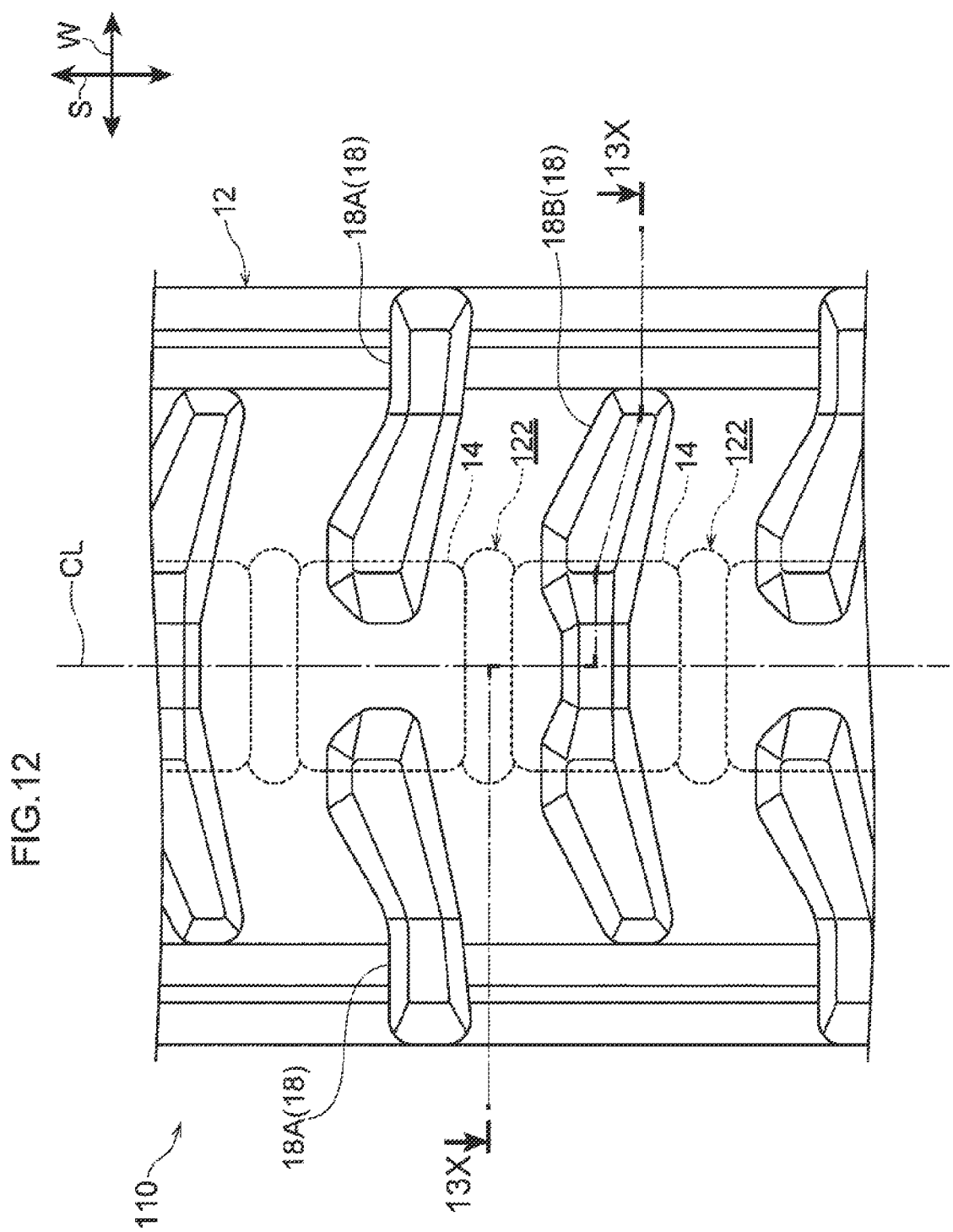
FIG. 12 is a plan view of the rubber crawler of the fourth embodiment as seen from the outer peripheral side.
Figure 13:
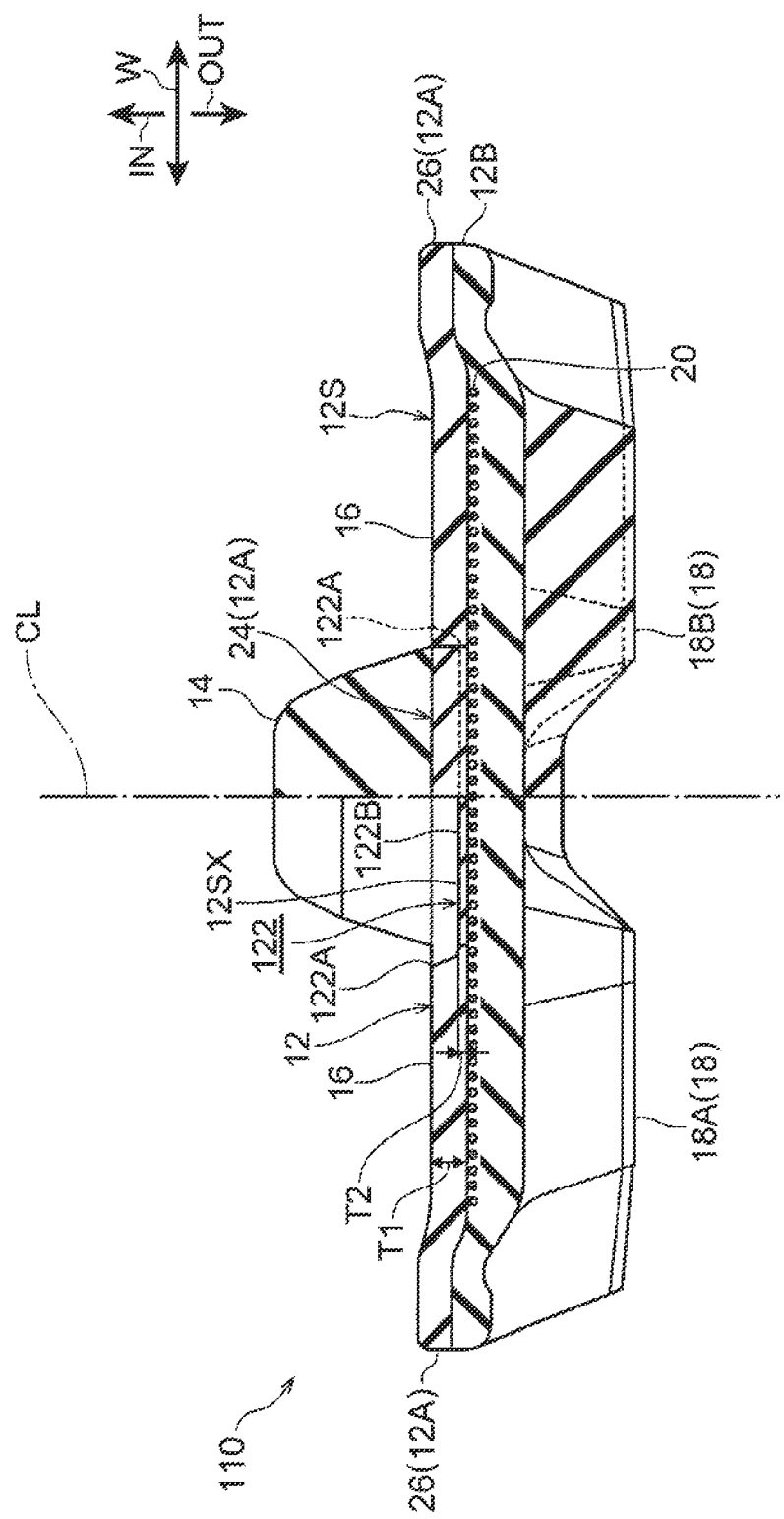
FIG. 13 is a sectional view taken along line 13X-13X of FIG. 12.
Figure 14:
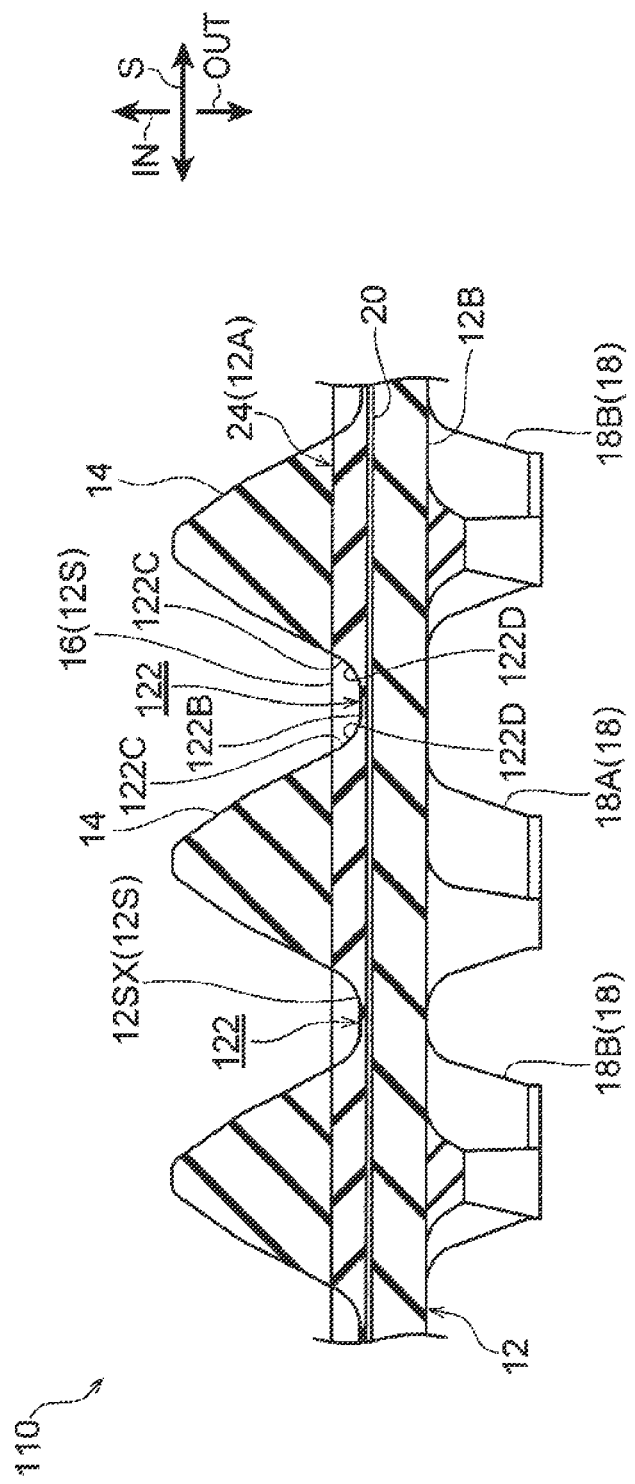
FIG. 14 is a sectional view of the rubber crawler of the fourth embodiment as cut along a centerline passing through the center in the crawler width direction.

As shown in FIG. 10, FIG. 11, and FIG. 14, recessed portions 122 that are recessed toward the crawler outer peripheral side are formed in the inner peripheral surface 12S of the rubber belt 12 between the rubber projections 14 adjacent to one another in the crawler circumferential direction. Specifically, as shown in FIG. 13, taking as a reference the wheel rolling surfaces 16 that configure part of the inner peripheral surface 12S, the recessed portions 122 of the present embodiment are recessed further toward the crawler outer peripheral side than the wheel rolling surfaces 16. That is, taking as a reference the main cord layer 20 that becomes a neutral plane (neutral axis) of bending when the rubber crawler 110 has been entrained about the drive wheel 100 and the idler wheel 102, a rubber thickness T2 of the regions corresponding to the recessed portions 122 is thinner than a rubber thickness T1 of the regions corresponding to the wheel rolling surfaces 16.

The rubber thickness T1 is a distance measured along the crawler inside and outside direction between the inner peripheral surface of the main cord layer 20 and the wheel rolling surfaces 16, and the rubber thickness T2 is a distance measured along the crawler inside and outside direction between the inner peripheral surface of the main cord layer 20 and the bottom surfaces of the recessed portions 122.

Furthermore, it is preferred that the rubber thickness T2 be thinner than half the rubber thickness T1.

As shown in FIG. 10 and FIG. 11, the recessed portions 122 extend along the crawler width direction and extend outward in the crawler width direction from between the mutually adjacent rubber projections 14 as far as the crawler width direction outer sides of the rubber projections 14. For this reason, in the present embodiment, both crawler width direction end portions 122A of each of the recessed portions 122 penetrate the wheel rolling surfaces 16. That is, the recessed portions 122 of the present embodiment are formed straddling the low-hardness rubber portion 24 and the outside rubber portions 26 on both sides. Furthermore, when reference sign W1 denotes the width of the wheel rolling surfaces 16 and reference sign W2 denotes the amount of penetration of the end portions 122A of the recessed portions 122 into the wheel rolling surfaces 16, it is preferred that the amount of penetration W2 be about 1 to 30% of the width W1.

Moreover, the recessed portions 122 are formed spanning the distance between the mutually adjacent rubber projections 14 in the inner peripheral surface 12S of the rubber belt 12 (see FIG. 14).

Furthermore, in the present embodiment, the end portions 122A of the recessed portions 122 are curved in circular arc shapes outward in the crawler width direction. Because of this configuration, stress can be suppressed from concentrating locally in the end portions 122A of the recessed portions 122.

As shown in FIG. 14, recessed walls 122C of the recessed portions 122 of the present embodiment are curved in circular arc shapes toward bottom portions 122B. Because of this, stress can be suppressed from concentrating locally between the bottom portions 122B and the recessed walls 122C of the recessed portions 122. In the present embodiment, the inner peripheral surfaces 12SX are formed by the bottom surfaces and the wall surfaces of the recessed portions 122.

Next, the action and effects of the rubber crawler 110 of the fourth embodiment will be described. Description of action and effects of the present embodiment that are the same as the action and effects of the first embodiment will be appropriately omitted.

In the rubber crawler 110, the recessed portions 122 that are recessed toward the crawler outer peripheral side are formed in the inner peripheral surface 12S of the rubber belt 12 between the mutually adjacent rubber projections 14, so the bending stiffness of the regions between the mutually adjacent rubber projections 14 of the rubber belt 12 (the bending stiffness with which the rubber belt 12 is bent inward or outward) becomes lower. Because of this, the entrainment resistance when the rubber belt 12 is entrained about the drive wheel 100 and the idler wheel 102 is reduced, that is, the entrainment resistance of the rubber crawler 110 is reduced. As a result, the energy loss of the crawler vehicle on which the rubber crawler 110 is used is reduced and fuel economy is improved.

Furthermore, it becomes easier for the rubber crawler 110 to bend along the outer peripheral surface 100B of the drive wheel 100, so the engagement (meshing) between the pin portions (not shown in the drawings) of the drive wheel 100 and the rubber projections 14 is improved and the occurrence of the tooth skipping phenomenon (a phenomenon in which the pin portions skip over the rubber projections 14) is suppressed.

Furthermore, in the rubber crawler 110, the recessed portions 122 are formed in the inner peripheral surface 12S of the rubber belt 12 between the mutually adjacent rubber projections 14, so the amount of rubber (rubber volume) in the regions between the mutually adjacent rubber projections 14 of the rubber belt 12 is reduced, and the amount of heat generated in the regions between the rubber projections 14 of the rubber belt 12 that is entrained about the drive wheel 100 and the idler wheel 102 and repeatedly bent during travel is reduced.

Moreover, in the rubber crawler 110, the weight of the rubber crawler 110 is reduced because of the formation of the recessed portions 122. Because of this, the fuel economy of the crawler vehicle on which the rubber crawler 110 is used can be further improved.

In the rubber crawler 110, the recessed portions 122 extend in the crawler width direction, so the bending stiffness in the regions between the mutually adjacent rubber projections 14 of the rubber belt 12 is further reduced. Because of this, the entrainment resistance when the rubber belt 12 is entrained about the wheels (the drive wheel 100 and the idler wheel 102) is reduced.

Furthermore, in the rubber crawler 110, the recessed portions 122 are formed spanning the distance between the mutually adjacent rubber projections 14 in the inner peripheral surface 12S of the rubber belt 12, so the entrainment resistance when the rubber belt 12 is entrained about the drive wheel 100 and the idler wheel 102 can be effectively reduced.

Additionally, even if during travel the rubber crawler 110 crawls over a protruding object (a rock, etc.) on the ground or a curb on a road surface and reversely bends, for example, so that tensile stress (bending stress) acts on the crawler inner peripheral side of the main cord layer 20 (the neutral plane (neutral axis) of bending) between the mutually adjacent rubber projections 14 of the rubber belt 12, excessive tensile stress can be suppressed from acting on the crawler inner peripheral side of the main cord layer 20 between the mutually adjacent rubber projections 14 of the rubber belt 12 because, as described above, the recessed portions 122 are formed spanning the distance between the mutually adjacent rubber projections 14 in the inner peripheral surface 12S, and the rubber thickness, from the main cord layer 20, between the mutually adjacent rubber projections 14 is thin.

In the rubber crawler 110, the recessed portions 122 extend outward in the crawler width direction from between the mutually adjacent rubber projections 14, so the entrainment resistance when the rubber belt 12 is entrained about the drive wheel 100 and the idler wheel 102 can be further reduced.

In the rubber crawler 110 of the fourth embodiment, as shown in FIG. 11, the recessed portions 122 are formed spanning the distance between the mutually adjacent rubber projections 14 in the inner peripheral surface 12S of the rubber belt 12, but the present invention is not limited to this configuration; the entrainment resistance of the rubber crawler 110 can be reduced provided that recessed portions that are recessed toward the crawler outer peripheral side are formed in parts of the areas between the mutually adjacent rubber projections 14. For example, one or plural recessed portions whose open shape is circular, oval, or substantially polygonal, for example, may also be formed between the mutually adjacent rubber projections 14 of the rubber belt 12. Furthermore, as example modifications of the recessed portions 122, recessed portions 124 shown in FIG. 18A and FIG. 18B and recessed portions 126 shown in FIG. 19A and FIG. 19B may also be used.

Figure 18A:
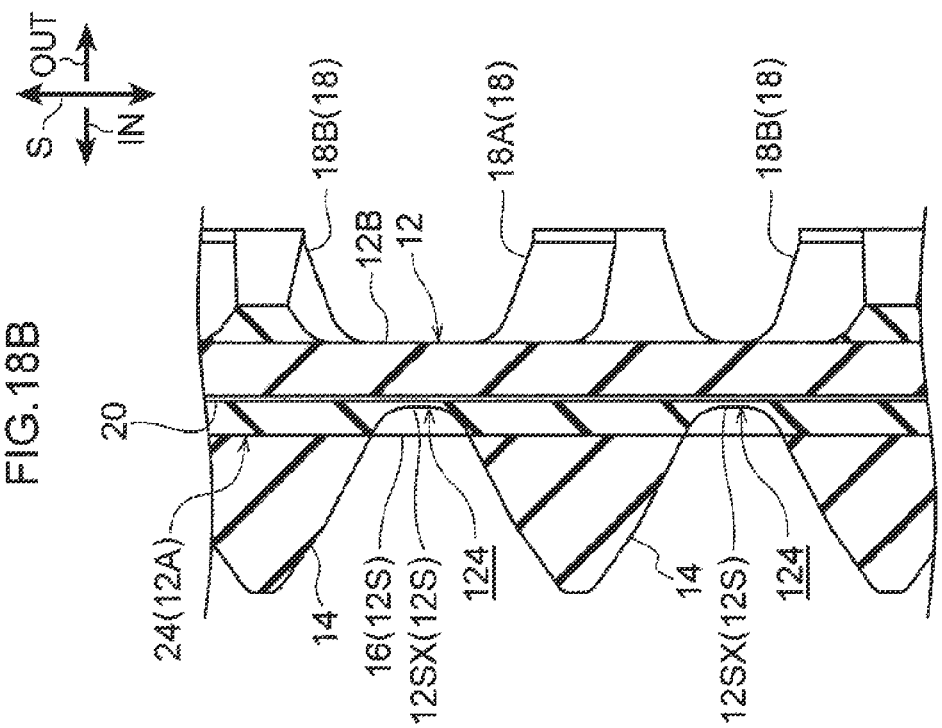
FIG. 18A is a plan view of a rubber crawler having recessed portions pertaining to a first example modification of the fourth embodiment as seen from the inner peripheral side.
Figure 18B:
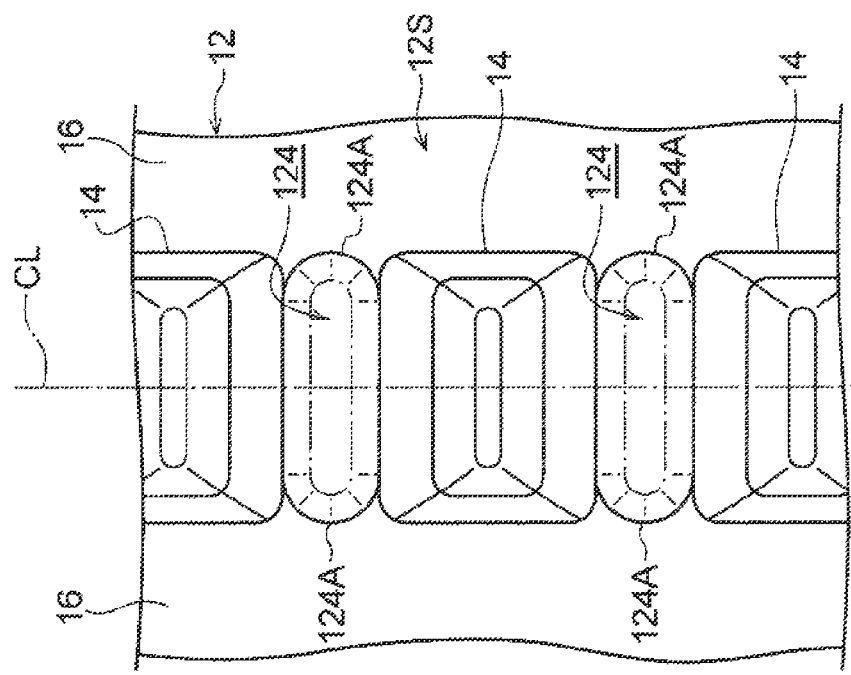
FIG. 18B is a sectional view of the rubber crawler having the recessed portions pertaining to the first example modification of the fourth embodiment as cut along the centerline passing through the center in the crawler width direction.

The recessed portions 124 (a first example modification of the recessed portions 122) shown in FIG. 18A and FIG. 18B are formed in the inner peripheral surface 12S only between the mutually adjacent rubber projections 14; that is, crawler width direction end portions 124A of the recessed portions 124 are formed between the mutually adjacent rubber projections 14. Because of this, up and down movement of the wheels (particularly the roller wheels 104) rolling on the wheel rolling surfaces 16 caused by the recessed portions 124 is suppressed.

The recessed portions 126 (a second example modification of the recessed portions 122) shown in FIG. 19A and FIG. 19B are formed only between the rubber projections 14 adjacent to one another in the crawler circumferential direction, extend in the crawler width direction, and are disposed adjacent to crawler circumferential direction base portions of the rubber projections 14. Furthermore, bottom portions 126B of the recessed portions 126 are curved in circular arc shapes toward the crawler outer peripheral side. Because the bottom portions 126B are curved in circular arc shapes in this way, local concentration of stress in the bottom portions 126B of the recessed portions 126 can be suppressed.

Furthermore, the configuration of the recessed portions 122 of the fourth embodiment may also be applied to the rubber crawler 30 of the second embodiment and the rubber crawler 40 of the third embodiment.

Fifth Embodiment

Next, a rubber crawler of a fifth embodiment pertaining to the present invention will be described with reference to FIG. 15 to FIG. 17. The same reference signs will be assigned to configurations that are the same as those of the fourth embodiment, and description of those same configurations will be omitted.

Figure 15:
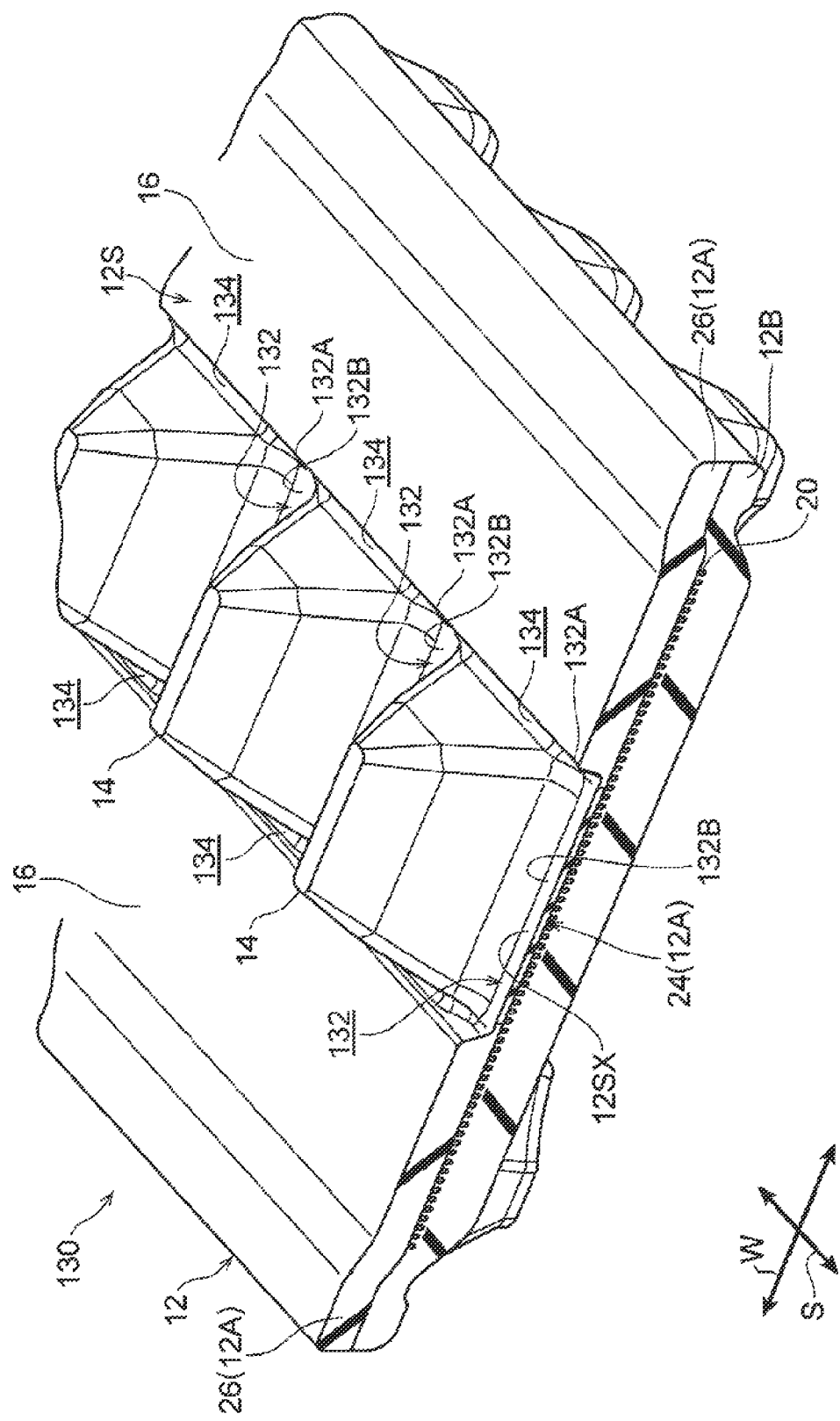
FIG. 15 is an enlarged perspective view including a partial section of a rubber crawler of a fifth embodiment.

As shown in FIG. 15 and FIG. 16, a rubber crawler 130 of the present embodiment has the same configuration as that of the rubber crawler 110 of the fourth embodiment except for the configurations of recessed portions and circumferential direction grooves. For this reason, the configurations of recessed portions 132 and circumferential direction grooves 134 will be described below.

As shown in FIG. 15 and FIG. 16, the recessed portions 132 extend outward in the crawler width direction from between the mutually adjacent rubber projections 14 and are formed spanning the distance between the mutually adjacent rubber projections 14. Furthermore, recessed walls 132C of the recessed portions 132 are curved in circular arc shapes toward bottom portions 132B. Because of this, stress can be suppressed from concentrating locally between the bottom portions 132B and the recessed walls 132C of the recessed portions 132.

The circumferential direction grooves 134, which are adjacent to the bases of the rubber projections 14 and extend straightly along the crawler circumferential direction, are formed in the inner peripheral surface 12S of the rubber belt 12 on both crawler width direction outer sides of the rubber projections 14. The circumferential direction grooves 134 interconnect crawler width direction end portion 132A sides of the recessed portions 132 adjacent to one another in the crawler circumferential direction.

As shown in FIG. 15 and FIG. 17, the groove depth of the circumferential direction grooves 134 is shallower than the depth of the recessed portions 132.

Next, the action and effects of the rubber crawler 130 of the fifth embodiment will be described. Description of action and effects of the present embodiment that are the same as the action and effects of the fourth embodiment will be appropriately omitted.

In the rubber crawler 130, the circumferential direction grooves 134 that extend in the crawler circumferential direction are formed adjacent to the bases of the rubber projections 14 in the inner peripheral surface 12S of the rubber belt 12, and the circumferential direction grooves 134 interconnect the crawler width direction end portion 132A sides of the recessed portions 132 adjacent to one another in the crawler circumferential direction, so, for example, when the end portion sides (the crawler width direction end portion sides) of the rubber belt 12 ride up onto a protruding object (a rock, etc.) on the ground or a curb on a road surface so that one side end portion becomes raised, the circumferential direction grooves 134 become deformed (elastically deformed in such a way that their groove width becomes narrower) and excessive bending stress (bending stress in the crawler width direction) can be suppressed from acting on the boundary sections between the rubber projections 14 and the rubber belt 12.

Furthermore, by forming the circumferential direction grooves 134 in the rubber belt 12, the entrainment resistance when the rubber belt 12 is entrained about the drive wheel 100 and the idler wheel 102 can also be reduced.

Moreover, in the rubber crawler 130, even when the rubber projections 14 receive force (wheel thrust force) in the crawler width direction from the wheels, excessive stress can be suppressed from acting on the boundaries between the rubber projections 14 and the rubber belt 12 because the circumferential direction grooves 134 are formed adjacent to the bases of the rubber projections 14.

In the fifth embodiment, the circumferential direction grooves 134 are given a configuration in which they extend straightly along the crawler circumferential direction, but the present invention is not limited to this configuration, and the circumferential direction grooves 134 may also extend in a wave-like shape (including sine waves, square waves, etc.) or a zigzag shape in the crawler circumferential direction provided that they can interconnect the recessed portions 132 adjacent to one another in the crawler circumferential direction.

Furthermore, the circumferential direction grooves 134 of the fifth embodiment may also be used to interconnect the recessed portions 124 of the first example modification adjacent to one another in the crawler circumferential direction or to interconnect the recessed portions 126 of the second example modification adjacent to one another in the crawler circumferential direction.

Furthermore, the configurations of the recessed portions 132 and the circumferential direction grooves 134 of the fifth embodiment may also be applied to the rubber crawler 30 of the second embodiment and the rubber crawler 40 of the third embodiment.

The first to fifth embodiments are given a configuration where the pin portions (not shown in the drawings) of the drive wheel 100 engage with the rubber projections 14 to transmit the drive force from the crawler vehicle to the rubber crawler, but the present invention is not limited to this configuration and may also be given a configuration where pin portions are not disposed on the drive wheel 100 and the drive force from the crawler vehicle is transmitted to the rubber crawler by frictional force between the outer peripheral surface 100B of the drive wheel 100 and the inner peripheral surface (the wheel rolling surfaces 16) of the rubber crawler.

Modes of carrying out the present invention have been described above by way of embodiments, but these embodiments are examples and can be modified and implemented in a variety of ways without departing from their spirit. Furthermore, it goes without saying that the scope of rights of the present invention is not limited to these embodiments.

Test Example

In order to verify the effects of the present invention, a rubber crawler of a working example included in the present invention and a rubber crawler of a comparative example not included in the present invention were tested as follows. Test crawlers of the same size were used for the test.

Test Rubber Crawlers

Working Example a rubber crawler with the same structure as the first embodiment.

Comparative Example the same structure as the rubber crawler of the first embodiment, but the rubber forming the rubber projections and the rubber forming the areas between the rubber projections had the same hardness, and the rubber forming the areas between the rubber projections did not contain the novolac phenolic resin and hexamethylenetetramine.

<Test Method>

The test rubber crawlers were entrained about a drive wheel and a trailing wheel of an experimental device, a predetermined tension was applied, passively rotating rollers were pressed against the section between the drive wheel and the trailing wheel, reverse bending was reproduced, and in this state the test rubber crawlers were circulated between the drive wheel and the trailing wheel until cracks occurred in the rubber forming the inner peripheral surfaces between the rubber projections. Table 1 shows the test results. Regarding the distance traveled (number of rotations) until crack initiation in Table 1, an index taking the comparative example as 100 was used, and the larger the numerical value the better the result. Furthermore, the blending amount of the novolac phenolic resin in Table 1 is a value with respect to 100 parts by mass of the rubber component, and the blending amount of hexamethylenetetramine is a value with respect to 100 parts by mass of the novolac phenolic resin.

TABLE 1

|  | Comparative Example | Working Example |
|---|---|---|
| Hardness of rubber of rubber projections | 85 | 85 |
| Hardness of rubber between rubber projections | 85 | 83 |
| Whether or not phenolic resin and hardener contained | No | Yes |
| Blending amount of phenolic resin | — | 5 |
| Blending amount of hardener | — | 10 |
| Distance traveled at time of crack initiation | 100 | 340 |

As will be understood from Table 1, compared to the rubber crawler of the comparative example, the rubber crawler of the working example included in the present invention had improved distance traveled until crack initiation in the rubber forming the inner peripheral surface at regions corresponding to the areas between the rubber projections when the rubber crawler was repeatedly reversely bent. That is, it will be understood that with the rubber crawler of the working example, excessive tensile stress is suppressed from acting on the rubber forming the inner peripheral surface at regions corresponding to the areas between the rubber projections.

The invention claimed is:

1. A rubber crawler comprising:
    an endless rubber body that is entrained about plural wheels;
    plural rubber projections that are disposed on the rubber body and spaced apart from one another in a rubber body circumferential direction, project toward an inner peripheral side of the rubber body, and come into contact with the wheels to limit movement of the wheels in a rubber body width direction; and a low-hardness rubber portion that configures part of an inner peripheral surface of the rubber body, is disposed between mutually adjacent rubber projections, and is formed by a rubber having a lower hardness than the rubber projections, wherein regions of the rubber body on rubber body width direction outer sides of the low-hardness rubber portion are formed by a rubber having a lower hardness than the low-hardness rubber portion.

2. The rubber crawler according to claim 1, wherein
the low-hardness rubber portion extends continuously in the rubber body circumferential direction, and
the rubber projections are disposed on the low-hardness rubber portion.

3. The rubber crawler according to claim 1, wherein the rubber forming the low-hardness rubber portion contains a novolac phenolic resin and a hardener for the novolac phenolic resin.

4. The rubber crawler according to claim 3, wherein the hardener for the novolac phenolic resin is hexamethylenetetramine.

5. The rubber crawler according to claim 1, further comprising recessed portions that are formed in the inner peripheral surface between the mutually adjacent rubber projections and are recessed toward an outer peripheral side of the rubber body.

6. The rubber crawler according to claim 5, wherein the recessed portions extend along the rubber body width direction.

7. The rubber crawler according to claim 6, further comprising circumferential direction grooves that are formed in the inner peripheral surface on both rubber body width direction sides of the rubber projections and adjacent to bases of the rubber projections, extend in the rubber body circumferential direction, and interconnect rubber body width direction end portion sides of the recessed portions adjacent to one another in the rubber body circumferential direction.

8. The rubber crawler according to claim 5, wherein the recessed portions are formed spanning a distance between the mutually adjacent rubber projections.

9. The rubber crawler according to claim 5, wherein the recessed portions extend outward in the rubber body width direction from between the mutually adjacent rubber projections.

10. The rubber crawler according to claim 5, wherein bottom portions of the recessed portions are curved in circular arc shapes toward the rubber body outer peripheral side.

* * * * *